(12) United States Patent
Tao et al.

(10) Patent No.: US 8,938,129 B2
(45) Date of Patent: Jan. 20, 2015

(54) DISPLAY SYSTEM WITH EDGE MAP CONVERSION MECHANISM AND METHOD OF OPERATION THEREOF

(75) Inventors: Li Tao, Irvine, CA (US); Yeong-Taeg Kim, Irvine, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 264 days.

(21) Appl. No.: 13/460,458

(22) Filed: Apr. 30, 2012

(65) Prior Publication Data

US 2013/0287303 A1 Oct. 31, 2013

(51) Int. Cl.
*G06K 9/48* (2006.01)
*G06K 9/40* (2006.01)

(52) U.S. Cl.
USPC ............... 382/266; 382/199; 382/260

(58) Field of Classification Search
None
See application file for complete search history.

(56) References Cited

U.S. PATENT DOCUMENTS 7,343,032 B2 * 3/2008 Oakley et al. ............... 382/128
2013/0201358 A1 * 8/2013 Sun ............................. 348/222.1

* cited by examiner

*Primary Examiner* — Matthew Bella
*Assistant Examiner* — Jose M Torres
(74) *Attorney, Agent, or Firm* — IP Investment Law Group

(57) ABSTRACT

A method of operation of a display system includes: receiving an input image having input pixels; identifying input edge pixels from the input pixels; calculating an edge pixel sum for one of the input edge pixels based on the number of the input edge pixels surrounding one of the input edge pixels; identifying pruned edge pixels from the input edge pixels having the edge pixel sum between a high edge density threshold and a low edge density threshold; and selecting a dominant image line from candidate lines calculated between the pruned edge pixels to generate a processed image for displaying on a device.

20 Claims, 10 Drawing Sheets

DISPLAY SYSTEM WITH EDGE MAP CONVERSION MECHANISM AND METHOD OF OPERATION THEREOF

TECHNICAL FIELD

The present invention relates generally to a display system, and more particularly to a system for image conversion.

BACKGROUND ART

Modern consumer and industrial electronics, especially devices such as graphical display systems, televisions, projectors, cellular phones, portable digital assistants, and combination devices, are providing increasing levels of functionality to support modern life including three-dimensional display services. Research and development in the existing technologies can take a myriad of different directions.

As users become more empowered with the growth of three-dimensional display devices, new and old paradigms begin to take advantage of this new device space. There are many technological solutions to take advantage of this new display device opportunity. One existing approach is to display three-dimensional images on consumer, industrial, and mobile electronics such as video projectors, televisions, monitors, gaming systems, mobile phones, or a personal digital assistant (PDA).

Three-dimensional display based services allow users to create, transfer, store, and/or consume information in order for users to create, transfer, store, and consume in the "real world". One such use of three-dimensional display based services is to efficiently present three-dimensional images on a display.

Three-dimensional display systems have been incorporated in projectors, televisions, notebooks, handheld devices, and other portable products. Today, these systems aid users by displaying available relevant information, such as diagrams, maps, or videos. The display of three-dimensional images provides invaluable relevant information.

However, displaying information in three-dimensional form has become a paramount concern for the consumer. Displaying a three-dimensional image that does not correlate with the real world decreases the benefit of using the three-dimensional display systems. For example, objects over an image having a disparity in depth can cause discomfort to users.

Thus, a need still remains for a three-dimensional display system with edge map image conversion mechanism to display three-dimensional images. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a display system including: receiving an input image having input pixels; identifying input edge pixels from the input pixels; calculating an edge pixel sum for one of the input edge pixels based on the number of the input edge pixels surrounding one of the input edge pixels; identifying pruned edge pixels from the input edge pixels having the edge pixel sum between a high edge density threshold and a low edge density threshold; and selecting a dominant image line from candidate lines calculated between the pruned edge pixels to generate a processed image for displaying on a device.

The present invention provides a display system, including: a control unit; a communication unit, coupled to the control unit, for receiving an input image having input pixels; an edge detection module, coupled to the control unit, for identifying input edge pixels from the input pixels; an edge sum module, coupled to the control unit, for calculating an edge pixel sum for one of the input edge pixels based on the number of the input edge pixels surrounding one of the input edge pixels; an edge threshold module, coupled to the edge sum module, for identifying pruned edge pixels from the input edge pixels having the edge pixel sum between a high edge density threshold and a low edge density threshold; and a line selection module, coupled to the control unit; for selecting a dominant image line from candidate lines calculated between the pruned edge pixels to generate a processed image for displaying on a device.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
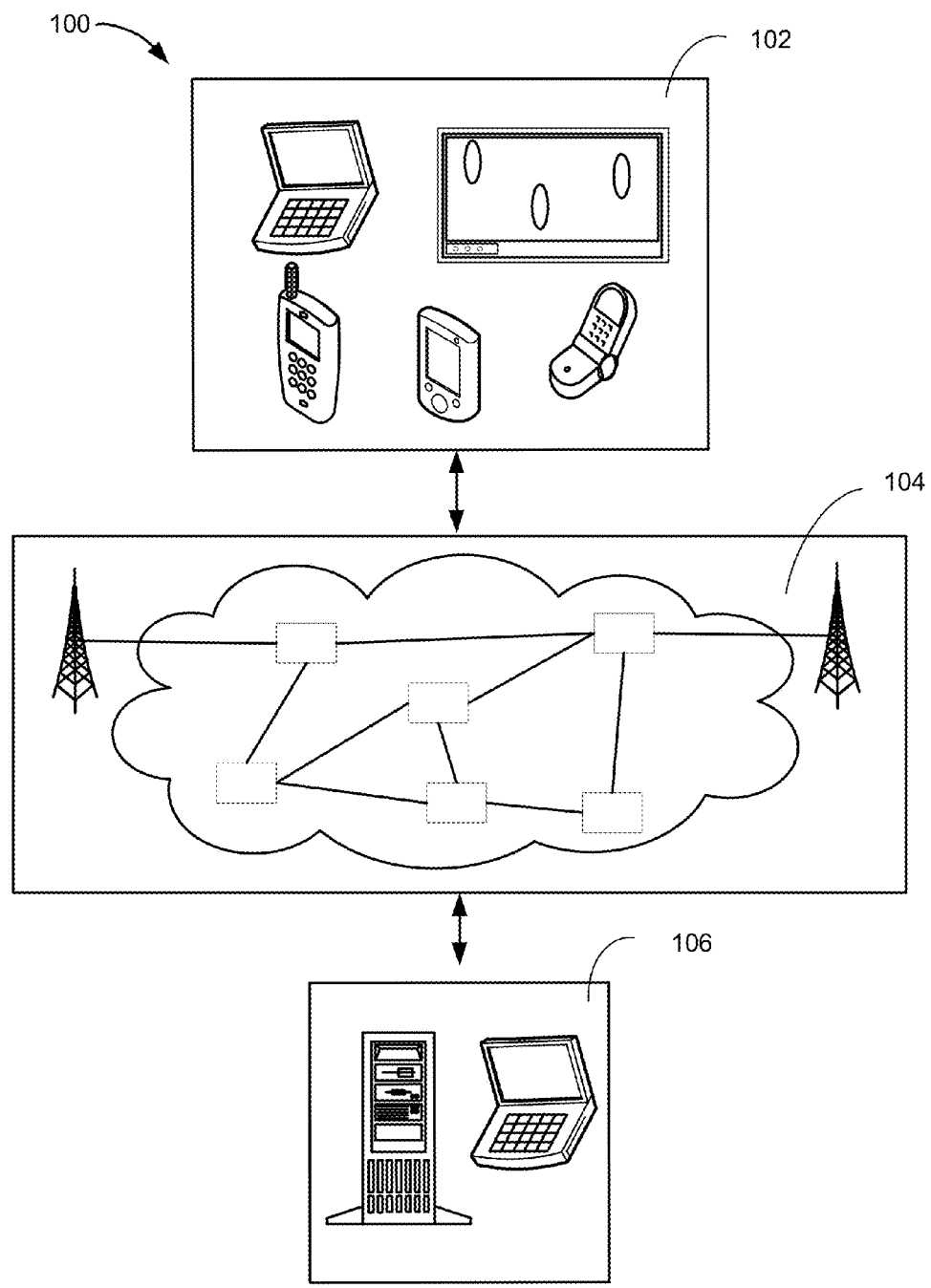
FIG. 1 is a display system with image conversion mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which image information is expressed is not critical to some embodiments of the invention. For example, in some embodiments, image information is presented in the format of (X, Y), where X and Y are two coordinates that define the location of a pixel in an image.

Three-dimensional image information is presented by a format of (X, Y, Z) with related information for color of the pixel. In a further embodiment of the present invention, the three-dimensional image information also includes an intensity or brightness element.

For expository purposes, the term "horizontal" as used herein refers to the horizontal direction seen when viewing the drawing as indicated by the figure designation of "FIG.". The term "vertical" refers to a direction perpendicular to the horizontal as just defined. Terms, such as "above", "below", "bottom", "top", "side", "higher", "lower", "upper", "over", and "under", are defined with respect to the horizontal, as shown in the figures.

The term "image" referred to herein can include a two-dimensional image, three-dimensional image, video frame, a computer file representation, an image from a camera, a video frame, or a combination thereof. For example, the image can be a machine readable digital file, a physical photograph, a digital photograph, a motion picture frame, a video frame, an x-ray image, a scanned image, or a combination thereof. The image can be generated from pixels arranged in a rectangular array. The image can include an x-axis along the direction of the rows and a y-axis along the direction of the columns.

The term "module" referred to herein can include software, hardware, or a combination thereof. For example, the software can be machine code, firmware, embedded code, and application software. Also for example, the hardware can be circuitry, a processor, a computer, an integrated circuit, integrated circuit cores, a pressure sensor, an inertial sensor, a micro-electromechanical system (MEMS), passive devices, or a combination thereof.

Referring now to FIG. 1, therein is shown a display system 100 with image conversion mechanism in an embodiment of the present invention. The display system 100 includes a first device 102, such as a client or a server, connected to a second device 106, such as a client or server. The first device 102 can communicate with the second device 106 with a communication path 104, such as a wireless or wired network.

For example, the first device 102 can be of any of a variety of display devices, such as a cellular phone, personal digital assistant, a notebook computer, a liquid crystal display (LCD) system, or other multi-functional displays or entertainment devices. The first device 102 can couple directly or indirectly to the communication path 104 to communicate with the second device 106 or can be a stand-alone device.

For illustrative purposes, the display system 100 is described with the first device 102 as a display device, although it is understood that the first device 102 can be different types of devices. For example, the first device 102 can also be a device for presenting images or a multi-media presentation. A multi-media presentation can be a presentation including sound, a sequence of streaming images or a video feed, or a combination thereof. As an example, the first device 102 can be a high definition television, a three dimensional television, a computer monitor, a personal digital assistant, a cellular phone, or a multi-media set.

The second device 106 can be any of a variety of centralized or decentralized computing devices, image or video transmission devices. For example, the second device 106 can be a multimedia computer, a laptop computer, a desktop computer, a video game console, grid-computing resources, a virtualized computer resource, cloud computing resource, routers, switches, peer-to-peer distributed computing devices, a media playback device, a Digital Video Disk (DVD) player, a three-dimension enabled DVD player, a recording device, such as a camera or video camera, or a combination thereof. In another example, the second device 106 can be a signal receiver for receiving broadcast or live stream signals, such as a television receiver, a cable box, a satellite dish receiver, or a web enabled device, such as a TiVo™ or Slingbox™.

The second device 106 can be centralized in a single room, distributed across different rooms, distributed across different geographical locations, embedded within a telecommunications network. The second device 106 can have a means for coupling with the communication path 104 to communicate with the first device 102.

For illustrative purposes, the display system 100 is described with the second device 106 as a computing device, although it is understood that the second device 106 can be different types of devices. Also for illustrative purposes, the display system 100 is shown with the second device 106 and the first device 102 as end points of the communication path 104, although it is understood that the display system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), high-definition multimedia interface (HDMI) cable, and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN), or a combination thereof.

Figure 2:
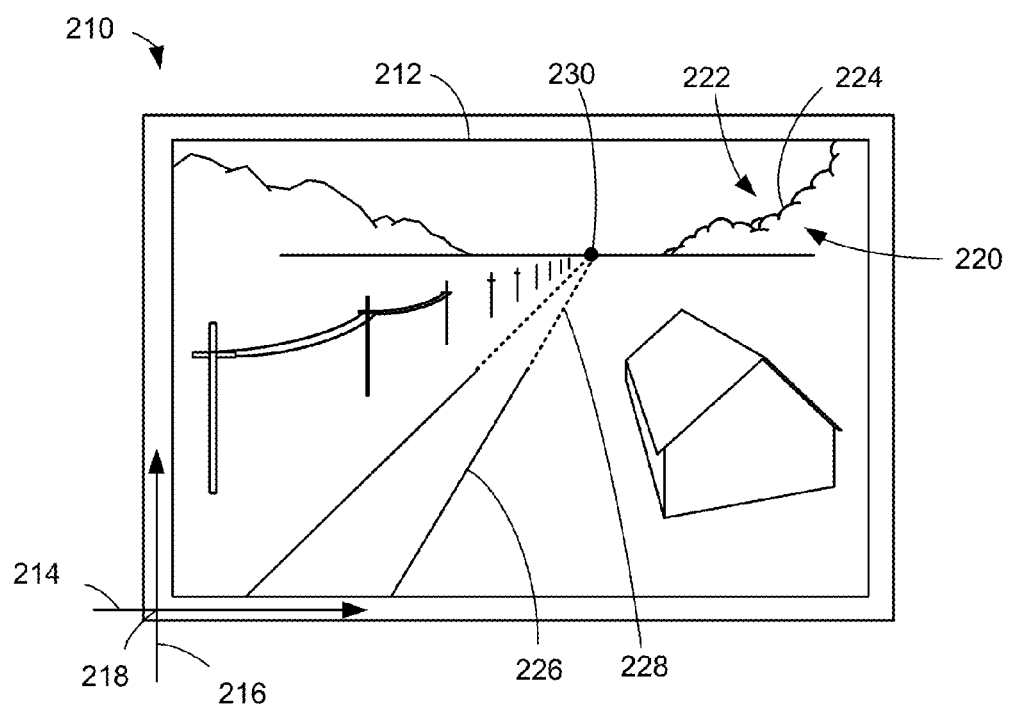
FIG. 2 is an example of a display interface of the first device of FIG. 1.

Referring now to FIG. 2, therein is shown an example of a display interface 210 of the first device 102 of FIG. 1. The display interface 210 is a physical device for presenting the image or the multi-media presentations. For example, the display interface can be a screen, including a liquid crystal display (LCD) panel, a plasma screen, or a projection screen.

The display interface 210 can display an input image 212. The input image 212 is defined as the image received by the display system 100 for processing. The input image 212 can be a color image, a black and white image, or a gray scale image.

Points within the input image 212 can be represented by a Cartesian coordinate system having an x-axis 214, a y-axis 216, and an image origin 218. The x-axis 214 is defined as a reference for the measurement of distance in the horizontal dimension of an image. The y-axis 216 is defined as a reference for the measurement of distance in the vertical dimension of an image.

The image origin 218 is defined as a point of reference within an image for determine the relative location of a point within the image. The image origin 218 can be located at any fixed position within the image. For example, the image origin 218 can be located at any corner or at the center of the input image 212.

For the purpose of illustration and description, the image origin 218 will be designated as the lower left corner of the input image 212. For example, increasing values along the x-axis 214 can represent increasing distance from the left side of the input image 212 to the right side of the input image 212. As a further example increasing values along the y-axis 216 can represent increasing distance from the bottom of the input image 212 to the top of the input image 212.

The input image 212 can include a first image region 220 and a second image region 222. The first image region 220 and the second image region 222 are defined as portions or areas of the image having similar image properties. The image properties are defined as properties that are used to generate an image on a display. For example, the image properties can include the luminance or colors used to generate objects in the input image 212.

The first image region 220 and the second image region 222 can have image properties that are different from each other. For example, the first image region 220 can have a color or luminance that differ significantly from the color or luminance of the second image region 222. As a specific example, the first image region 220 can represent an object in the input image 212, such as white clouds, and the second image region 222 can represent a different object in the input image 212, such as a blue sky:

The first image region 220 and the second image region 222 can be separated by an image edge 224. The image edge 224 is defined as the boundary between different regions of an image.

The image edge 224 can have edge characteristics. The edge characteristics are defined as the shape and dimension of the image edge 224. For example, the edge characteristics of the image edge 224 can include the length, width, thickness, continuity, sharpness, or curvature.

The edge characteristics of the image edge 224 can be determined by shape, the image properties, or a combination thereof of the first image region 220 and the second image region 222. For example, for the image edge 224 between the first image region 220 representing a portion of white clouds and the second image region 222 representing a light blue sky, the image edge 224 can be smooth, wide and thick, having a gradual change in color, intensity, and shape. In this example, the edge characteristics are broad and not well defined producing the image edge 224 between the first image region 220 and the second image region 222 that is soft, weak, or difficult to identify.

In another example, for the image edge 224 between the first image region 220 representing a portion of dark jagged mountains and the second image region 222 representing a light blue sky, the image edge 224 can be jagged and narrow with sharp change in color, intensity, direction, and shape. In this example, the image edge 224 can be narrow and well-defined producing the image edge 224 that a strong, sharp, and easily identified.

The image edge 224 can be used to identify or detect lines and shapes within the input image 212. The display system 100 can process the image edge 224 to improve identification or detection of the lines and shapes in the input image 212. For example, the display system 100 can remove or ignore portions of or an entire one of the image edge 224 that can contribute to false line detection. As a specific example, the display system 100 can ignore the image edge 224 in portions of the input image 212 with high variations in luminance intensity or in areas where the image edge 224 is scattered or highly discontinuous. In another example, the display system 100 can reduce the width of the image edge 224 that is broad or wide to improve the accuracy and precision of line detection.

The display system 100 can process the image edge 224 to identify dominant image lines 226 in the input image 212. The dominant image lines 226 are defined as lines that represent the edges, outlines, sides, or lines that make up prominent shapes or objects in the image. For example, the dominant image lines 226 can represent the outline or edges of a road or the outline or sides of the roof of a house.

The dominant image lines 226 can be used to use in downstream or additional processing to generate a processed image for displaying on the first device 102. For example, the dominant image lines 226 can be used to identify vanishing lines 228 and a vanishing point 230 in an image for converting the input image 212 from a two-dimensional image to a three-dimensional image.

The vanishing lines 228 are defined as lines that converge or can be extrapolated to converge at a point that is perceived as the most distant or furthest away in an image. For example, the vanishing lines 228 can be the outer edges of a road that appears to vanish into the horizon. As a further example, the vanishing lines 228 can be selected as the dominant image lines 226 that converge to a point in the input image 212.

The vanishing point 230 is defined as the point can be perceived as the most distant or furthest away in an image. For example, the vanishing point 230 can be the point where the vanishing lines 228 of the input image 212 converge.

The input image 212 can be processed to generate the processed image in a number of different ways. For example, the input image 212 can be converted from a two-dimensional image to a three-dimensional image with the vanishing lines 228 and the vanishing point 230 that are identified from the dominant image lines 226. In this example, the objects in the input image 212 can be assigned depth along the vanishing lines 228 and relative to the vanishing point 230. As a specific example, objects that appear closer to the vanishing point 230 can appear further away in the input image 212.

Figure 3:
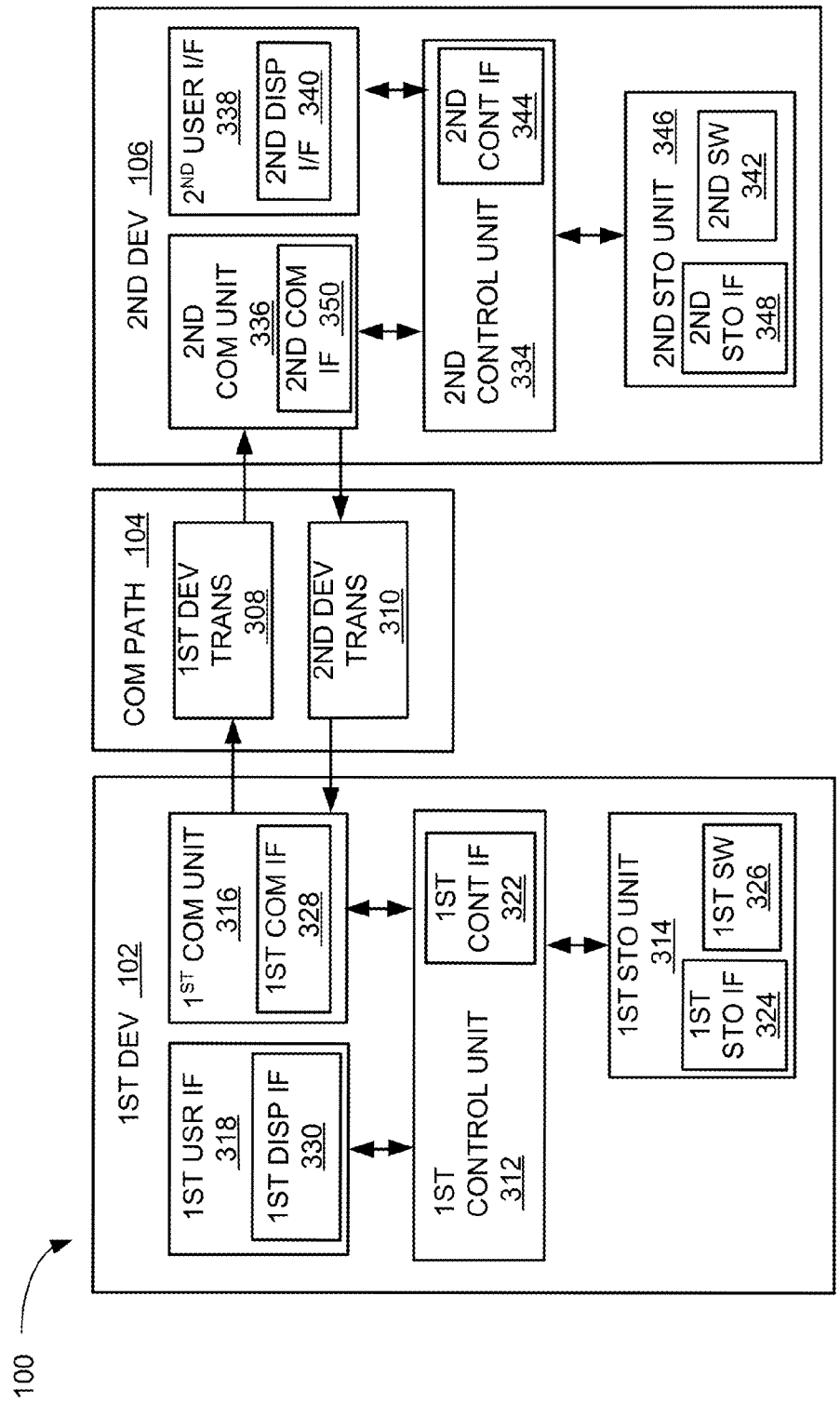
FIG. 3 is an exemplary block diagram of the display system.

Referring now to FIG. 3, therein is shown an exemplary block diagram of the display system 100. The display system 100 can include the first device 102, the communication path 104, and the second device 106. The first device 102 can send information in a first device transmission 308 over the communication path 104 to the second device 106. The second device 106 can send information in a second device transmission 310 over the communication path 104 to the first device 102.

For illustrative purposes, the display system 100 is shown with the first device 102 as a client device, although it is understood that the display system 100 can have the first device 102 as a different type of device. For example, the first device 102 can be a server having a display interface.

Also for illustrative purposes, the display system 100 is shown with the second device 106 as a server, although it is understood that the display system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 312, a first storage unit 314, a first communication unit 316, and a first user interface 318. The first control unit 312 can include a first control interface 322. The first control unit 312 can execute a first software 326 to provide the intelligence of the display system 100:

The first control unit 312 can be implemented in a number of different manners. For example, the first control unit 312 can be a processor, an application specific integrated circuit (ASIC) an embedded processor, a microprocessor, a hardware control logic, a hardware finite state machine (FSM), a digital signal processor (DSP), or a combination thereof. The first control interface 322 can be used for communication between the first control unit 312 and other functional units in the first device 102. The first control interface 322 can also be used for communication that is external to the first device 102.

The first control interface 322 can receive information from the other functional units or from external sources, or can transmit information to the other functional units or to external destinations. The external sources and the external destinations refer to sources and destinations external to the first device 102.

The first control interface 322 can be implemented in different ways and can include different implementations depending on which functional units or external units are being interfaced with the first control interface 322. For example, the first control interface 322 can be implemented with a pressure sensor, an inertial sensor, a microelectromechanical system (MEMS), optical circuitry, waveguides, wireless circuitry, wireline circuitry, or a combination thereof.

The first storage unit 314 can store the first software 326. The first storage unit 314 can also store the relevant information, such as data representing incoming images, data representing previously presented image, sound files, or a combination thereof.

The first storage unit 314 can be a volatile memory, a nonvolatile memory, an internal memory, an external memory, or a combination thereof. For example, the first storage unit 314 can be a nonvolatile storage such as non-volatile random access memory (NVRAM), Flash memory, disk storage, or a volatile storage such as static random access memory (SRAM).

The first storage unit 314 can include a first storage interface 324. The first storage interface 324 can be used for communication between and other functional units in the first device 102. The first storage interface 324 can also be used for communication that is external to the first device 102.

The first storage interface 324 can receive information from the other functional units or from external sources, or can transmit information to the other functional units or to external destinations. The external sources and the external destinations refer to sources and destinations external to the first device 102.

The first storage interface 324 can include different implementations depending on which functional units or external units are being interfaced with the first storage unit 314. The first storage interface 324 can be implemented with technologies and techniques similar to the implementation of the first control interface 322.

The first communication unit 316 can enable external communication to and from the first device 102. For example, the first communication unit 316 can permit the first device 102 to communicate with the second device 106 of FIG. 1, an attachment, such as a peripheral device or a computer desktop, and the communication path 104.

The first communication unit 316 can also function as a communication hub allowing the first device 102 to function as part of the communication path 104 and not limited to be an end point or terminal unit to the communication path 104. The first communication unit 316 can include active and passive components, such as microelectronics or an antenna, for interaction with the communication path 104.

The first communication unit 316 can include a first communication interface 328. The first communication interface 328 can be used for communication between the first communication unit 316 and other functional units in the first device 102. The first communication interface 328 can receive information from the other functional units or can transmit information to the other functional units.

The first communication interface 328 can include different implementations depending on which functional units are being interfaced with the first communication unit 316. The first communication interface 328 can be implemented with technologies and techniques similar to the implementation of the first control interface 322.

The first user interface 318 allows a user (not shown) to interface and interact with the first device 102. The first user interface 318 can include an input device and an output device. Examples of the input device of the first user interface 318 can include a keypad, a touchpad, soft-keys, a keyboard, a microphone, an infrared sensor for receiving remote signals, or any combination thereof to provide data and communication inputs.

The first user interface 318 can include a first display interface 330. The first display interface 330 can include a display, a projector, a video screen, a speaker, or any combination thereof.

The first control unit 312 can operate the first user interface 318 to display information generated by the display system 100. The first control unit 312 can also execute the first software 326 for the other functions of the display system 100. The first control unit 312 can further execute the first software 326 for interaction with the communication path 104 via the first communication unit 316.

The second device 106 can be optimized for implementing the present invention in a multiple device embodiment with the first device 102. The second device 106 can provide the additional or higher performance processing power compared to the first device 102. The second device 106 can include a second control unit 334, a second communication unit 336, and a second user interface 338.

The second user interface 338 allows a user (not shown) to interface and interact with the second device 106. The second user interface 338 can include an input device and an output device. Examples of the input device of the second user interface 338 can include a keypad, a touchpad, soft-keys, a keyboard, a microphone, or any combination thereof to provide data and communication inputs. Examples of the output device of the second user interface 338 can include a second display interface 340. The second display interface 340 can include a display, a projector, a video screen, a speaker, or any combination thereof.

The second control unit 334 can execute a second software 342 to provide the intelligence of the second device 106 of the display system 100. The second software 342 can operate in conjunction with the first software 326. The second control unit 334 can provide additional performance compared to the first control unit 312.

The second control unit 334 can operate the second user interface 338 to display information. The second control unit 334 can also execute the second software 342 for the other functions of the display system 100, including operating the second communication unit 336 to communicate with the first device 102 over the communication path 104.

The second control unit 334 can be implemented in a number of different manners. For example, the second control unit 334 can be a processor, an embedded processor, a microprocessor, a hardware control logic, a hardware finite state machine (FSM), a digital signal processor (DSP), or a combination thereof.

The second control unit 334 can include a second controller interface 344. The second controller interface 344 can be used for communication between the second control unit 334 and other functional units in the second device 106. The second controller interface 344 can also be used for communication that is external to the second device 106.

The second controller interface 344 can receive information from the other functional units or from external sources, or can transmit information to the other functional units or to external destinations. The external sources and the external destinations refer to sources and destinations external to the second device 106.

The second controller interface 344 can be implemented in different ways and can include different implementations depending on which functional units or external units are being interfaced with the second controller interface 344. For example, the second controller interface 344 can be implemented with a pressure sensor, an inertial sensor, a microelectromechanical system (MEMS), optical circuitry, waveguides, wireless circuitry, wireline circuitry, or a combination thereof.

A second storage unit 346 can store the second software 342. The second storage unit 346 can also store the such as data representing incoming images, data representing previously presented image, sound files, or a combination thereof. The second storage unit 346 can be sized to provide the additional storage capacity to supplement the first storage unit 314.

For illustrative purposes, the second storage unit 346 is shown as a single element, although it is understood that the second storage unit 346 can be a distribution of storage elements. Also for illustrative purposes, the display system 100 is shown with the second storage unit 346 as a single hierarchy storage system, although it is understood that the display system 100 can have the second storage unit 346 in a different configuration. For example, the second storage unit 346 can be formed with different storage technologies forming a memory hierarchal system including different levels of caching, main memory, rotating media, or off-line storage.

The second storage unit 346 can be a volatile memory, a nonvolatile memory, an internal memory, an external memory, or a combination thereof. For example, the second storage unit 346 can be a nonvolatile storage such as non-volatile random access memory (NVRAM), Flash memory, disk storage, or a volatile storage such as static random access memory (SRAM).

The second storage unit 346 can include a second storage interface 348. The second storage interface 348 can be used for communication between other functional units in the second device 106. The second storage interface 348 can also be used for communication that is external to the second device 106.

The second storage interface 348 can receive information from the other functional units or from external sources, or can transmit information to the other functional units or to external destinations. The external sources and the external destinations refer to sources and destinations external to the second device 106.

The second storage interface 348 can include different implementations depending on which functional units or external units are being interfaced with the second storage unit 346. The second storage interface 348 can be implemented with technologies and techniques similar to the implementation of the second controller interface 344.

The second communication unit 336 can enable external communication to and from the second device 106. For example, the second communication unit 336 can permit the second device 106 to communicate with the first device 102 over the communication path 104.

The second communication unit 336 can also function as a communication hub allowing the second device 106 to function as part of the communication path 104 and not limited to be an end point or terminal unit to the communication path 104. The second communication unit 336 can include active and passive components, such as microelectronics or an antenna, for interaction with the communication path 104.

The second communication unit 336 can include a second communication interface 350. The second communication interface 350 can be used for communication between the second communication unit 336 and other functional units in the second device 106. The second communication interface 350 can receive information from the other functional units or can transmit information to the other functional units.

The second communication interface 350 can include different implementations depending on which functional units are being interfaced with the second communication unit 336. The second communication interface 350 can be implemented with technologies and techniques similar to the implementation of the second controller interface 344.

The first communication unit 316 can couple with the communication path 104 to send information to the second device 106 in the first device transmission 308. The second device 106 can receive information in the second communication unit 336 from the first device transmission 308 of the communication path 104.

The second communication unit 336 can couple with the communication path 104 to send information to the first device 102 in the second device transmission 310. The first device 102 can receive information in the first communication unit 316 from the second device transmission 310 of the communication path 104. The display system 100 can be executed by the first control unit 312, the second control unit 334, or a combination thereof.

For illustrative purposes, the second device 106 is shown with the partition having the second user interface 338, the second storage unit 346, the second control unit 334, and the second communication unit 336, although it is understood that the second device 106 can have a different partition. For example, the second software 342 can be partitioned differently such that some or all of its function can be in the second control unit 334 and the second communication unit 336. Also, the second device 106 can include other functional units not shown in FIG. 3 for clarity:

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the display system 100 is described by operation of the first device 102 and the second device 106. It is understood that the first device 102 and the second device 106 can operate any of the modules and functions of the display system 100.

Figure 4:
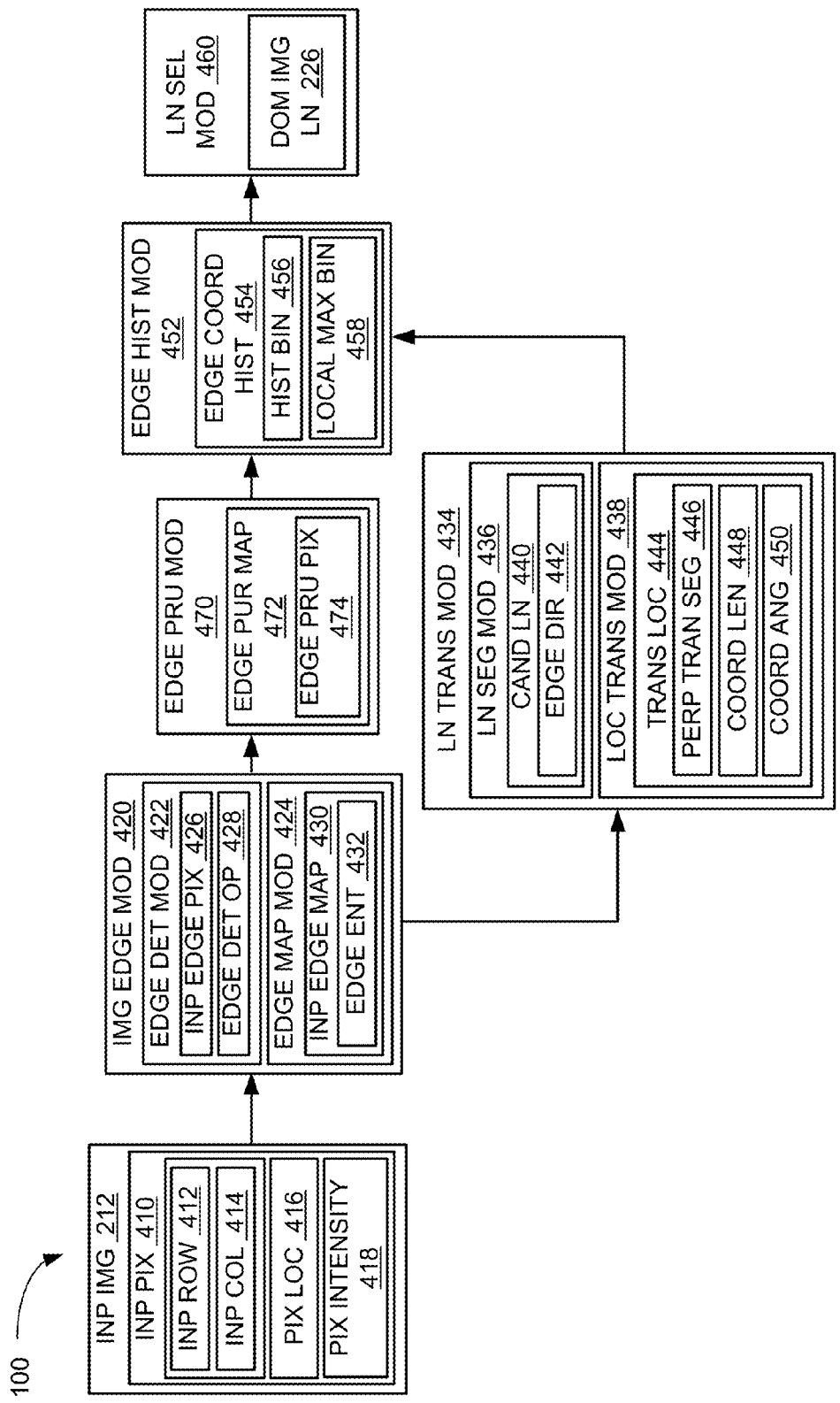
FIG. 4 is a first example of a control flow of the display system.

Referring now to FIG. 4, therein is shown a first example of a control flow of the display system 100. The input image 212 can be generated from input pixels 410. The input pixels 410 are defined as the individual pixels for generating the input image 212 on the display interface 210 of FIG. 2. For example, the input pixels 410 can be used to generate objects that represent clouds, sky, mountains, a road, or a house in the input image 212. The display system 100 can receive the input image 212 from the first communication unit 316 of FIG. 3.

The input pixels 410 can be arranged in an array of input rows 412 and input columns 414 in the input image 212. The input columns 414 of the input pixels 410 can be arranged in the vertical direction along the y-axis 216 between the bottom and the top of the input image 212. The input columns 414 can increase in value along the x-axis 214 beginning from the image origin 218 of FIG. 2. For example, one of the input columns 414 at the left side of the input image 212 can be the first column, increasing to the "$n^{th}$" column at the right side of the input image 212.

The input rows 412 can be arranged in the horizontal direction along the x-axis 214 of FIG. 2 between the left side and the right side of the input image 212. The input rows 412 can increase in value along the y-axis 216 of FIG. 2 beginning from the image origin 218. For example, one of the input rows 412 at the bottom of the input image 212 can be the first row, increasing to the "$m^{th}$" row at the top of the input image 212.

Each of the input pixels 410 can have a pixel location 416 within the input image 212 represented by coordinates along the x-axis 214 and the y-axis 216. The pixel location 416 is defined as the location of the pixels relative to a fixed point in the image. The pixel location 416 of each of the input pixels 410 can be assigned according to the input rows 412 and the input columns 414 relative to the image origin 218.

For example, one of the input pixels 410 located in the first one of the input rows 412 and the first one of the input columns 414, corresponding to the lower left corner of the input image 212, can have the pixel location 416 of (1, 1). As a further example, one of the input pixels 410 located in the "$n^{th}$" one of the input columns 414 and the "$m^{th}$" one of the input rows 412, corresponding to the upper right corner of the input image 212, can have the pixel location 416 of (n, m).

Each of the input pixels 410 can exhibit a pixel intensity 418. The pixel intensity 418 is defined as the brightness or energy of a pixel in an image. A low value of the pixel intensity 418 can represent a low brightness or energy. Similarly, high value of the pixel intensity 418 can represent a high brightness or energy.

For instance, in a gray scale image, the pixel intensity 418 can be set relative to black and white. For example, the color black can represent the lowest level of the pixel intensity 418. As a specific example, the input pixels 410 having a low value for the pixel intensity 418 can be closer to the color black. Conversely, the color white can represent the highest level of the pixel intensity 418. As a specific example, the input pixels 410 having a high value for the pixel intensity 418 can be closer to the color white.

In another specific example, the pixel intensity 418 can be used to represent the intensity of objects in the input image 212. In this example, the input pixels 410 representing the sun can have a high value of the pixel intensity 418 while the input pixels 410 representing a night sky or a shadow can have a low value of the pixel intensity 418.

The display system 100 can include an image edge module 420. The image edge module 420 is for detecting pixels representing an edge or a boundary between portions of an image having differences in the image properties and generating a map of the edge pixels. The image edge module 420 can perform these functions with an edge detection module 422 and an edge map module 424. The image edge module 420 can be coupled to the first control unit 312 of FIG. 3.

The edge detection module 422 is for identifying pixels representing edges between different regions or portions of an image. The edge detection module 422 can be coupled to the image edge module 420.

The edge detection module 422 can receive the input image 212. The edge detection module 422 can identify input edge pixels 426 in the input image 212. The input edge pixels 426 are defined as the pixels representing the edge between two regions in an image. For example, the input edge pixels 426 can represent the image edge 224 of FIG. 2 between the first image region 220 of FIG. 2 and the second image region 222 of FIG. 2. As a specific example, the input edge pixels 426 can represent the image edge 224 between the input pixels 410 representing objects such as the sky and other ones of the input pixels 410 representing clouds or mountains.

The edge detection module 422 can identify the input edge pixels 426 in the input image 212 using a variety of edge detection operations 428. The edge detection operations 428 are defined as processes or methods for identifying edge pixels in an image. For example, the edge detection operations 428 can include the Sobel operator, Canny edge detection, sub-sampling, Sobel-Max masking, principal component analysis (PCA), LaPlacian zero crossing, linking, differential edge detection, the Marr-Hildreth operator, phase congruency, or a combination thereof. As a further example, the edge detection operations 428 can include gradient and threshold operations.

The edge map module 424 is for generating a map of edge pixels in an image. The edge map module 424 can be coupled to the edge detection module 422.

The edge map module 424 can generate an input edge map 430 with the input edge pixels 426. The input edge map 430 is defined as the map of the location of the edge pixels in an image. The input edge map 430 can be a two-dimensional array having the same number of rows and columns as the input image 212.

The edge map module 424 can generate the input edge map 430 by generating edge entries 432 corresponding to each of the input edge pixels 426 in the input image 212. The edge entries 432 are defined as entries on a map corresponding to edge pixels in an image. The location of the edge entries 432 in the input edge map 430 can correspond with the pixel location 416 of the input edge pixels 426 in the input image 212.

The edge map module 424 can generate the one of the edge entries 432 as "one" corresponding to the pixel location 416 of one of the input pixels 410 when the edge detection module 422 identifies one of the input edge pixels 426. Conversely, if the edge detection module 422 does not identify one of the input pixels 410 as one of the input edge pixels 426, the edge map module 424 can generate the corresponding one of the edge entries 432 as "zero".

The display system 100 can include an edge prune module 470. The edge prune module 470 can be coupled to the image edge module 420. The edge prune module 470 is for processing a map of edge pixels with an edge pixel pruning operation to remove scattered or isolated edge pixels and edge pixels surrounded by a high number of other edge pixels as determined by a threshold. As an example, the threshold for determining a high number of edge pixels can be determined heuristically. Each of these functions will be discussed in detail below.

The edge prune module 470 can generate a pruned edge map 472 from the input edge map 430. The pruned edge map 472 is defined as the map of edge pixels processed to remove scattered or isolated edge pixels and edge pixels surrounded by a high number of other edge pixels as determined by a threshold. The pruned edge map 472 can be a map of pruned edge pixels 474. The pruned edge pixels 474 are defined as pixels remaining after an edge pixel pruning operation to remove scattered or isolated edge pixels and edge pixels surrounded by a high number of other edge pixels, as determined by a threshold.

A line transform module 434 can be coupled to the edge detection module 422. The line transform module 434 is for generating lines between pixel and calculating a transform coordinate for a point along the line. These functions can be performed with a line segment module 436 and a location transform module 438.

The line segment module 436 is for generating a line between two pixels in an image. The line segment module 436 can generate candidate lines 440 between one of the input edge pixels 426 and another one of the input edge pixels 426. The candidate lines 440 are defined as a straight line between two edge pixels.

As an example, the line segment module 436 can generate the candidate lines 440 between adjacent pairs of the input edge pixels 426 in the input image 212. In another example, the line segment module 436 can generate the candidate lines 440 between pairs of the input edge pixels 426 spaced apart by one or more intervening pixels. As a further example, the line segment module 436 can generate one or more lines between one of the input edge pixels 426 and another one of the input edge pixels 426.

The candidate lines 440 can be described by the equation 1:

$$y=m*x+b \qquad \text{equation 1}$$

The variable "y" can represent the input columns 414 of one of the input pixels 410. The variable "x" can represent the input rows 412 of one of the input pixels 410. The variable "m" can represent the slope of the line between two of the input pixels 410. The variable "b" can represent the x-intercept of the line.

The candidate lines 440 can have an edge direction 442. The edge direction 442 is defined as the angle measured between positive side of the x-axis 214 and the candidate lines 440. As an example, the edge direction 442 can have a range of $(-\pi+\pi)$.

The location transform module 438 is for converting the coordinates representing a point on a line in one coordinate system to analogous coordinates in a different coordinate system with a transform operation. The location transform module 438 can calculate a transform location 444 from the pixel location 416 and one of the candidate lines 440 associated with the input edge pixels 426.

The transform location 444 is defined as a coordinate representing a point on a line that has undergone a transform operation. As an example, the transform location 444 can be calculated by a coordinate transform operation, such a Hough transform.

The transform location 444 can be calculated based on a perpendicular transform segment 446. The perpendicular transform segment 446 is defined as a line segment that passes through the origin of a coordinate system and is perpendicular to a line connecting two pixels in an image. The location transform module 438 can calculate the perpendicular transform segment 446 as a line perpendicular with the candidate lines 440 associated with one of the input edge pixels 426 and passing through the image origin 218.

For the candidate lines 440 associated with one of the input edge pixels 426 having the pixel location 416 of $(x_o, y_o)$, the perpendicular transform segment 446 can be calculated according to equation 2:

$$\rho = x_o * \cos\theta + y_o * \sin\theta \qquad \text{equation 2}$$

The variable $\rho$ (rho) is a coordinate length 448 of the perpendicular transform segment 446. The coordinate length 448 is defined as the length of the perpendicular transform segment 446 between the candidate lines 440 and the image origin 218. As an example, the coordinate length 448 can have a range of $(-\infty+\infty)$.

The variable $\theta$ (lower case theta) is a coordinate angle 450 of the perpendicular transform segment 446. The coordinate angle 450 is defined as the angle measured between the perpendicular transform segment 446 and the positive side of the x-axis 214. As an example, the coordinate angle 450 can have a range of $(-\pi+\pi)$.

The coordinate angle 450 can be calculated according to equation 3:

$$\theta = 90° - \Theta \qquad \text{equation 3}$$

The variable $\Theta$ (upper case theta) is the edge direction 442 of the candidate lines 440 for one of the input edge pixels 426.

The transform location 444 can be represented as the coordinate length 448 and the coordinate angle 450 of the perpendicular transform segment 446 associated with one of the input edge pixels 426. For example, the input edge pixels 426 having the pixel location 416 of $(x_o, y_o)$ can have the transform location 444 of $(\rho_o, \theta_o)$.

The display system 100 can include an edge histogram module 452. The edge histogram module 452 is for generating a chart or graph of the distribution of coordinate associated with edge pixels from an image. The edge histogram module 452 can be coupled to the line transform module 434.

The edge histogram module 452 can generate an edge coordinate histogram 454 from the coordinate length 448 and the coordinate angle 450 for each of the candidate lines 440 associated with the pruned edge pixels 474.

The edge coordinate histogram 454 is defined as a two dimensional histogram that quantifies the number of pixels having similar transform coordinates. The first dimension of the edge coordinate histogram 454 can represent values of the coordinate length 448 and the second dimension of the edge coordinate histogram 454 can represent values of the coordinate angle 450.

The edge coordinate histogram 454 can have histogram bins 456 representing the candidate lines 440. The histogram bins 456 can correspond to a specific combination of one of the coordinate length 448 and the coordinate angle 450 or a small range including more than one of the coordinate length 448 and the coordinate angle 450.

For example, the one of the histogram bins 456 can correspond to the coordinate length 448 of "five" and the coordinate angle 450 of "twenty degrees." As another example, one of the histogram bins 456 can represent a range of values for the coordinate length 448, such as "four to six," and a range of values for the coordinate angle 450, such as "nineteen degrees to twenty one degrees."

The edge histogram module 452 can generate the edge coordinate histogram 454 by summing the transform location 444 for the pruned edge pixels 474 that correspond to a particular one of the histogram bins 456. For example, if the candidate lines 440 for one of the pruned edge pixels 474 has the transform location 444 corresponding to one of the histogram bins 456, then the edge histogram module 452 can increase the histogram count for the one of the histogram bins 456.

The edge histogram module 452 can include local maxima bins 458. The local maxima bins 458 are defined as the bins in a histogram having the histogram counts in the histogram. The edge coordinate histogram 454 can have one or more of the local maxima bins 458.

The display system 100 can include a line selection module 460. The line selection module 460 is for selecting the lines based on local maxima in a histogram. The line selection module 460 can select the dominant image lines 226 of FIG. 2 as the candidate lines 440 corresponding to the local maxima bins 458 of the edge coordinate histogram 454. The local maxima bins 458 can be based on the candidate lines 440 calculated between the pruned edge pixels 474.

As an example, the line selection module 460 can select one or more of the dominant image lines 226 when one or more of the local maxima bins 458 are identified by the line selection module 460. As a specific example, the line selection module 460 can select the dominant image lines 226 as the candidate lines 440 corresponding to the local maxima bins 458 having the highest histogram counts.

The dominant image lines 226 can be used to generate a processed image based on the input image 212. For example, the vanishing point 230 of FIG. 2 and the vanishing lines of FIG. 2 can be determined from the dominant image lines 226 for use in two-dimension to three-dimension image conversion.

In an example for the first device 102 of FIG. 3, the first software 326 of FIG. 3 of the first device 102 can include the display system 100. For example, the image edge module 420, the edge detection module 422, the edge map module 424, the line transform module 434, the line segment module 436, the edge histogram module 452, the line selection module 460, and the edge prune module 470 can be stored in the first software 326 and coupled to the first control unit 312.

The first control unit 312 can execute the first software 326. For example, the first control unit 312 of can execute the edge detection module 422 to identify the input edge pixels 426 from the input pixels 410 with the edge detection operations 428.

In an example for the second device 106 of FIG. 3, the second software 342 of FIG. 3 can include the display system 100. For example, the image edge module 420, the edge detection module 422, the edge map module 424, the line transform module 434, the line segment module 436, the edge histogram module 452, the line selection module 460, and the edge prune module 470 can be stored in the second software 342 and coupled to the second control unit 334.

The second control unit 334 can execute the first software 326. For example, the second control unit 334 of can execute the edge detection module 422 to identify the input edge pixels 426 from the input pixels 410 with the edge detection operations 428.

In another example, the display system 100 can be partitioned between the first software 326 and the second software 342. For example, the first software 326 can include the image edge module 420, the edge detection module 422, the edge map module 424, the line transform module 434, and the line segment module 436. The second software 342 can include the edge histogram module 452, the line selection module 460, and the edge prune module 470. The second control unit 334 can execute modules partitioned on the second software 342 and the first control unit 312 can execute modules partitioned on the first software 326.

The modules described for this control flow can be implemented in hardware depending on the context of usage. The context of usage can also be determined by the usage in claims later in this application. For example, in the system or apparatus claims, the modules are to be construed to be implemented in hardware. The modules can be part of the hardware functional units in FIG. 3, as such separate hardware state machines or hardware accelerator blocks to the first control unit 312 of FIG. 3 or the second control unit 334 of FIG. 3. The modules can also be implemented as discrete hardware blocks within the first device 102 of FIG. 3 or the second device 106 of FIG. 3.

The display system 100 describes the module functions or order as an example. The modules can be partitioned differently. For example, the edge detection module 422 can be stored in the second storage unit 346 and the first software 326 can include the edge map module 424. Each of the modules can operate individually and independently of the other modules.

Furthermore, data generated in one module can be used by another module without being directly coupled to each other. For example, the line transform module 434 can receive the input image 212.

It has been discovered that the present invention provides the display system 100 with the edge prune module 470 having improved accuracy in selection of the dominant image lines 226. The edge prune module 470 identifies the pruned edge pixels 474 which reduces the number of candidate lines 440 that can represent false edges or false lines, thus improving the accuracy in selection of the dominant image lines 226.

The physical transformation from displaying the input image 212 results in movement in the physical world, such as people moving in response to the input image 212 when playing games or viewing a three dimensional image. The first display interface 330 can display the input image 212 by manipulating the pixels on the first device 102 causing the players or viewers to move in response to the input image 212, thus resulting in movement in the physical world.

Figure 5:
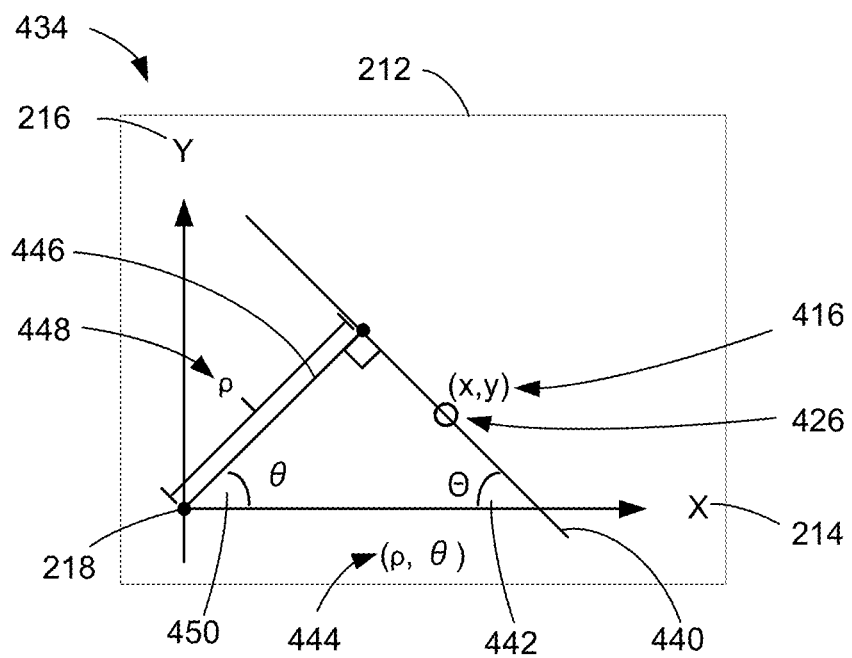
FIG. 5 is an illustration example of the line transform module in calculating the transform location.

Referring now to FIG. 5, therein is an illustration example of the line transform module 434 in calculating the transform location 444. FIG. 5 depicts a representation of a portion of the input image 212 having the image origin 218, the x-axis 214, as shown by the label "X," and the y-axis 216, as shown by the label "Y".

The portion of the input image 212 can include one of the input edge pixels 426 having the pixel location 416 of (x, y) and one of the candidate lines 440 associated with one of the input edge pixels 426. The candidate lines 440 as shown in FIG. 5 can be calculated according to Equation 1 of FIG. 4. The edge direction 442 of one of the candidate lines 440 is shown as variable Θ (upper case theta), which is the angle between the candidate lines 440 and the x-axis 214.

The perpendicular transform segment 446 is shown at a right angle with one of the candidate lines 440. The perpendicular transform segment 446 can pass through the image origin 218. The coordinate angle 450, labeled as the variable θ (lower case theta), is the angle measured between the perpendicular transform segment 446 and the positive side of the x-axis 214. The coordinate angle 450 as shown in FIG. 5 can be calculated according to Equation 3 of FIG. 4.

The coordinate length 448, labeled as the variable ρ (rho), is the length of the perpendicular transform segment 446 that is between one of the candidate lines 440 and the image origin 218. The coordinate length 448 as shown if FIG. 5 can be calculated according to Equation 2 of FIG. 4.

Figure 6:
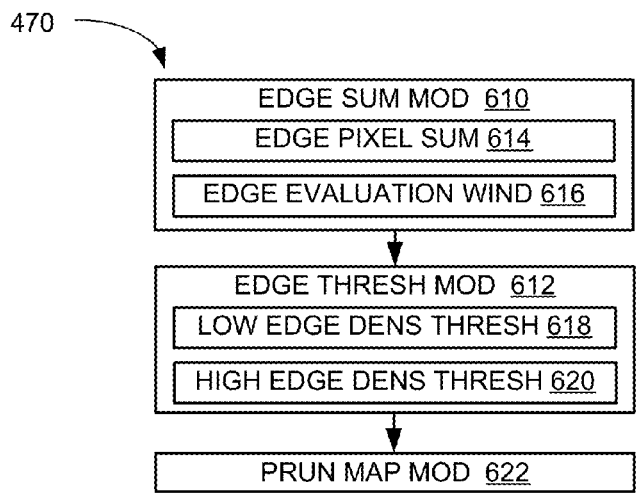
FIG. 6 is a detailed view of the edge prune module.

Referring now to FIG. 6, therein is shown a detailed view of the edge prune module 470. The edge prune module 470 can identify the pruned edge pixels 474 of FIG. 4 with an edge sum module 610 and an edge threshold module 612.

The edge sum module 610 is for calculating the number of edge pixels surrounding a specific edge pixel within a region of the image. The edge sum module 610 can be coupled to the edge prune module 470.

The edge sum module 610 can calculate an edge pixel sum 614 for each of the input edge pixels 426 of FIG. 4 in the input image 212. The edge pixel sum 614 is defined as the total number of the additional ones of the input edge pixels 426 surrounding one of the input edge pixels 426 within an edge evaluation window 616.

The edge evaluation window 616 is defined as a region or group of pixels surrounding a single pixel or a group of pixels. The edge evaluation window 616 can include a pre-determined or variable number of the input rows 412 of FIG. 4 of the input pixels 410 of FIG. 4 above and below the one of the input edge pixels 426. Similarly, the edge evaluation window 616 can extend a pre-determined or variable number of the input columns 414 of the input pixels 410 to the right and to the left of one of the input edge pixels 426. As an example, the number of the input rows 412 and the input columns 414 in the edge evaluation window 616 can be determined heuristically. The edge evaluation window 616 can be centered around one of the input edge pixels 426 for calculation of the edge pixel sum 614.

The edge sum module 610 can calculate the edge pixel sum 614 for the one of the input edge pixels 426 at the center of the edge evaluation window 616 by summing the total number of the input edge pixels 426 within the edge evaluation window 616. For example if one of the input pixels 410 in the edge evaluation window 616 corresponds to one of the input edge pixels 426, the edge sum module 610 can increase the value of the edge pixel sum 614 by one. Conversely, if one of the input pixels 410 in the edge evaluation window 616 does not corresponds to one of the input edge pixels 426, the edge sum module 610 will not increase the value of the edge pixel sum 614.

The edge threshold module 612 is for identifying pixels that are between a high pixel density and low pixel density threshold. The edge threshold module 612 can identify the pruned edge pixels 474 from the input edge pixels 426 by determining if the edge pixel sum 614 of one of the input edge pixels 426 is between a low edge density threshold 618 and a high edge density threshold 620. The edge threshold module 612 can be an edge pixel pruning operation. The edge threshold module 612 can be coupled to the edge prune module 470.

The low edge density threshold 618 is defined as a threshold for determining if an edge pixel is in a region having a low edge pixel density or a low number of edge pixels relative to the total number of pixels. The low edge density threshold 618 can be determined heuristically or can be a predetermined value or a value within a range of values, such as 25 to 50 of the input edge pixels 426 to the total number of the input pixels 410.

As an example, the low density of the input edge pixels 426 can represents areas or regions in the input image 212 where the input edge pixels 426 are sparse or scattered. In this example, the regions having a low pixel density of the input edge pixels 426 can include objects in the input image 212 of FIG. 2, such as long hair on a person's head or the leaves and petals in a bouquet of flowers.

In another example, a low density of the input edge pixels 426 in a region or area of the input image 212 can indicate noise or the existence of objects with complex textures and geometric shapes, which may not have any straight lines but only chunks or groups of strong or jagged edges. As a further example, the existence of regions or areas of the input image 212 having a low density of the input edge pixels 426 can contribute to problems in subsequent image processing, such as detection of false, scattered or segmented line and 2D to 3D conversion.

The high edge density threshold 620 is defined as a threshold for determining if an edge pixel is in a region having a high edge pixel density or a high number of edge pixels relative to the total number of pixels. As an example, the high density of the input edge pixels 426 can represents areas or regions in the input image 212 where the input edge pixels 426 are homogenous and high in number relative to the total number of the input pixels 410. In this example, the high density of the input edge pixels 426 can represent gradually changing areas in the input image 212 where the boundary between the input pixels 410 of FIG. 4 representing objects such as white clouds and a light blue sky.

In another example, a high density of the input edge pixels 426 in a region or area of the input image 212 can indicate the existence of chunky or wide edges. As a further example, the existence of regions or areas of the input image 212 having a high density of the input edge pixels can result in inaccurate calculation of the transform location 444 of FIG. 4, which includes the coordinate length 448 of FIG. 4 and the coordinate angle of FIG. 4, for the input edge pixels 426.

The edge prune module 470 can generate the pruned edge map 472 of FIG. 4 with a pruned map module 622. The pruned map module 622 is for removing scattered or isolated edge pixels and edge pixels surrounded by a high number of other edge pixels, as determined by a threshold, in an edge pixel map.

For example, the pruned map module 622 can remove the input edge pixels 426 in regions of the input image 212 having a high or low number of the input edge pixels 426 from the input edge map 430. The pruned map module 622 can be coupled to the edge prune module 470.

The pruned map module 622 can generate the pruned edge map 472 by modifying the edge entries 432 of FIG. 4 of the input edge pixels 426 that were not identified as the pruned edge pixels 474. For example, if the edge threshold module 612 does not identify one of the input edge pixels 426 as one of the pruned edge pixels 474, then the pruned map module 622 can change the corresponding one of the edge entries 432 from "one" to "zero." The edge entries 432 having the value of "zero" signifies that the corresponding input edge pixel is not one of the pruned edge pixels 474.

Conversely, if the edge threshold module 612 identifies one of the input edge pixels 426 as one of the pruned edge pixels 474, then the pruned map module 622 will not change the corresponding one of the edge entries 432. Modifying the edge entries 432 of the input edge pixels 426 that were not identified as the pruned edge pixels 474 can be a process of removing scattered or isolated edge pixels and edge pixels surrounded by a high number of other edge pixels.

It has been discovered that the present invention provides the display system 100 having improved edge thinning with the pruned edge map 472. Generating the pruned edge map 472 with the high edge density threshold 620 can remove the input edge pixels 426 in region or area of the input image 212 having chunky or wide edges thus providing improved edge thinning and improved accuracy for subsequent image processing.

It has also been discovered that the present invention provides the display system 100 having improved edge thinning with the pruned edge map 472. Generating the pruned edge map 472 with the low edge density threshold 618 can remove the input edge pixels 426 in region or area of the input image 212 having signal noise or the objects with complex textures and geometric shapes thus providing improved edge thinning and improved accuracy for subsequent image processing.

Figure 7:
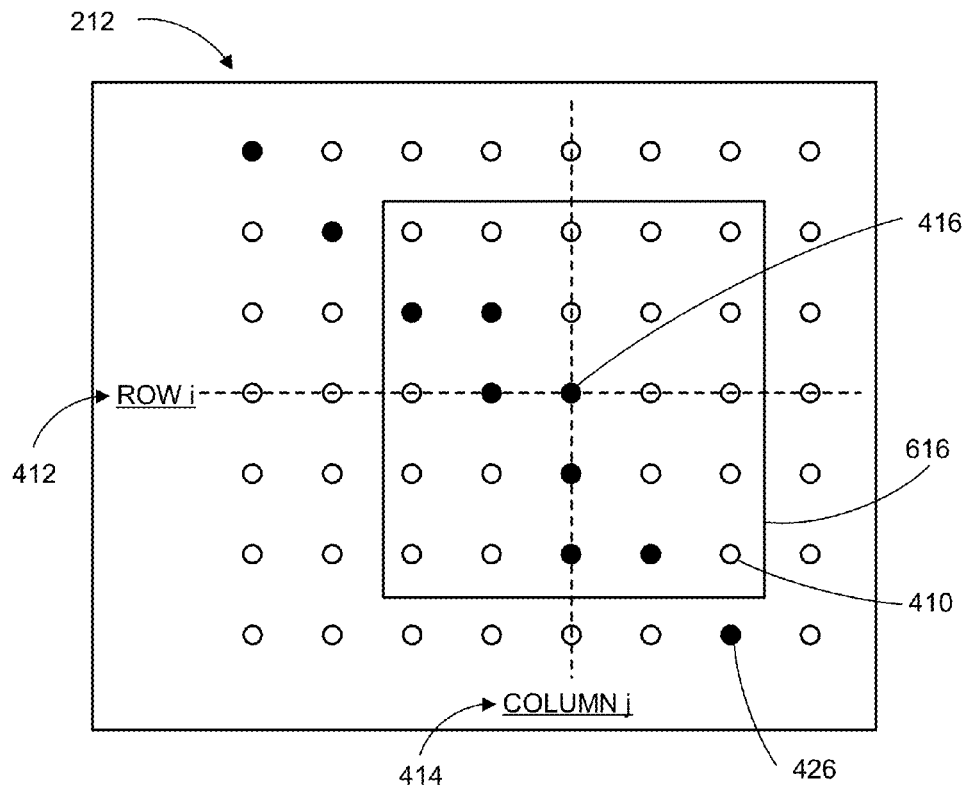
FIG. 7 is an example illustration of the edge sum module.

Referring now to FIG. 7, therein is an example illustration of the edge sum module 610. FIG. 6 depicts portion of the input image 212 including a group of the input pixels 410, as depicted by the open circles, and the input edge pixels 426, as depicted by the filled circles. The portion of the input image 212 can illustrate the edge evaluation window 616 having one of the input edge pixels 426 at the center, located in the input rows 412 "i" and the input columns 414 "j," as depicted by the dashed lines and corresponding to the pixel location 416 of (j, i).

The edge evaluation window 616 can have a dimension of "M" number of the input columns 414 to the left and the right of the pixel location 416 of (j, i). Similarly, the edge evaluation window 616 can have a dimension of "N" number of the input rows 412 above and below the pixel location 416 of (j, i).

For illustrative purposes, the edge evaluation window 616 can have the "M" number of input columns 414 as two, which can include two of the input rows 412 above and below the input edge pixels 426 and corresponding to the pixel location 416 of (j, i), although it is understood that the edge evaluation window 616 can include more or less than two of the input rows 412. Similarly, for illustrative purposes, the edge evaluation window 616 can have the "N" number of input rows 412 as two, which can include two of the input columns 414 to the left and right of the input edge pixels 426 and corresponding to the pixel location 416 of (j, i), although it is understood that the edge evaluation window 616 can include more or less than two of the input columns 414.

The edge sum module 610 can calculate the edge pixel sum 614 of FIG. 6 for the one of the input edge pixels 426 at the center of the edge evaluation window 616 by summing the total number of the input edge pixels 426 within the edge evaluation window 616. As illustrated by FIG. 7, for example, the edge sum module 610 can calculate the edge sum as "6."

As an example, the edge sum module 610 can calculate the edge pixel sum 614 according to equation 4 as follows:

$$P_{N \times M}(i, j) = \sum_{x=-N}^{N} \sum_{y=-M}^{M} e(i+x, j+y). \quad \text{equation 4}$$

The edge pixel sum 614 can be represented by the function "$P_{N \times M}(\ )$". The input edge pixels 426 at a given location within the edge evaluation window 616 can be represented by "$e(\ )$".

The edge prune module 470 of FIG. 4 can modify the edge entries 432 of FIG. 4 for one of the input edge pixels 426 as the based on the edge pixel sum 614, the low edge density threshold 618, and the high edge density threshold 620. As an example, the edge prune module 470 can modify the edge entries 432 based on equation 5, as follows:

$$e_p(x, y) = \begin{cases} 1 & \text{if } T_L \le P_{N \times M}(x, y) \le T_H \\ 0 & \text{otherwise.} \end{cases} \quad \text{equation 5}$$

The edge entries 432 for one of the input edge pixels 426 can be represented by "$e_p(\ )$". The low edge density threshold 618 can be represented by the variable "$T_L$": The high edge density threshold 620 can be represented by the variable "$T_H$".

Figure 8:
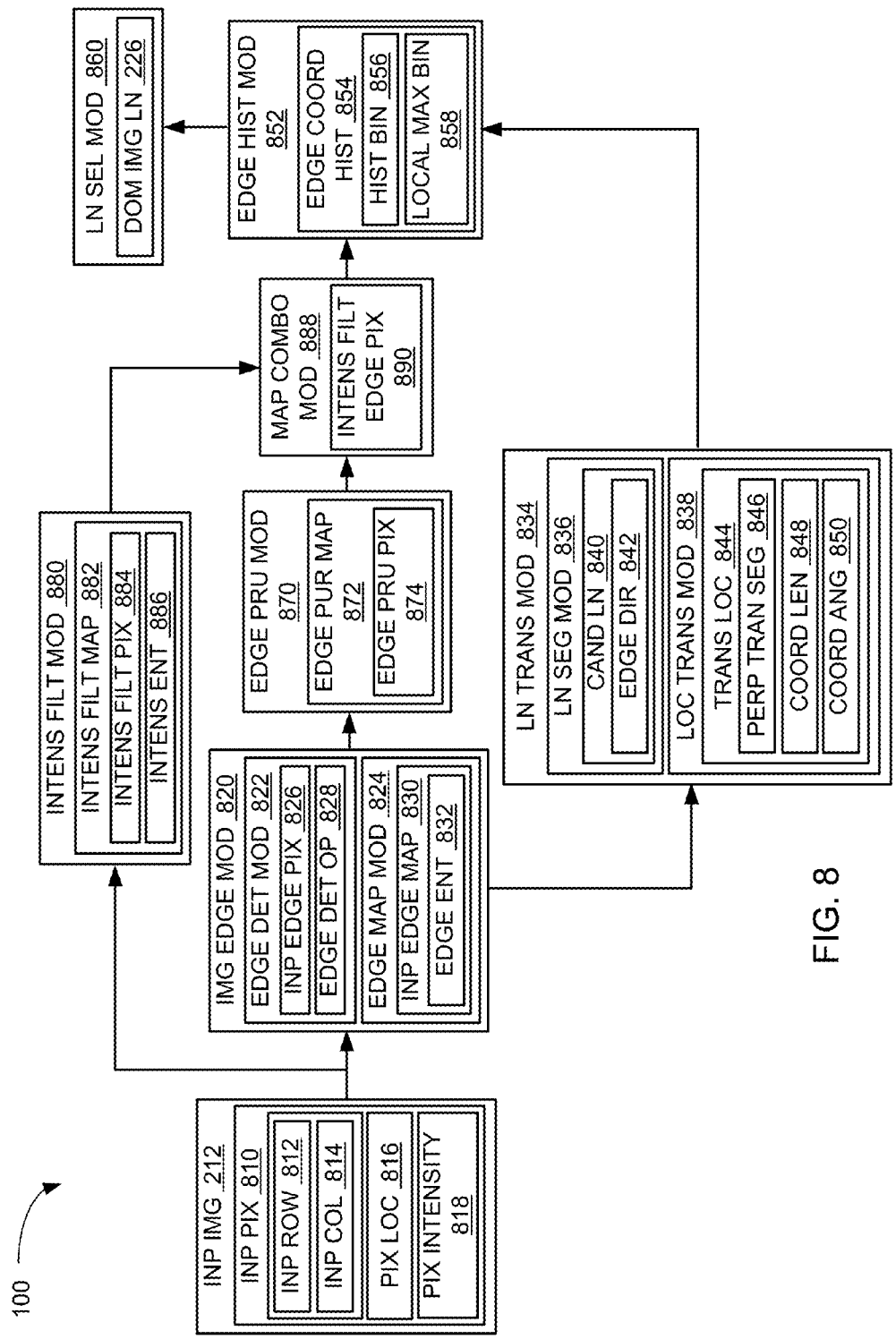
FIG. 8 is a second example of a control flow of the display system.

Referring now to FIG. 8, therein is shown a second example of a control flow of the display system 100. The input image 212 can be generated from input pixels 810. The input pixels 810 are defined as the individual pixels for generating the input image 212 on the display interface 210 of FIG. 2. For example, the input pixels 810 can be used to generate objects that represent clouds, sky, mountains, a road, or a house in the input image 212. The display system 100 can receive the input image 212 from the first communication unit 316 of FIG. 3.

The input pixels 810 can be arranged in an array of input rows 812 and input columns 814 in the input image 212. The input columns 814 of the input pixels 810 can be arranged in the vertical direction along the y-axis 216 between the bottom and the top of the input image 212. The input columns 814 can increase in value along the x-axis 214 beginning from the image origin 218 of FIG. 2. For example, one of the input columns 814 at the left side of the input image 212 can be the first column, increasing to the "$n^{th}$" column at the right side of the input image 212.

The input rows 812 can be arranged in the horizontal direction along the x-axis 214 of FIG. 2 between the left side and the right side of the input image 212. The input rows 812 can increase in value along the y-axis 216 of FIG. 2 beginning from the image origin 218. For example, one of the input rows 812 at the bottom of the input image 212 can be the first row, increasing to the "$m^{th}$" row at the top of the input image 212.

Each of the input pixels 810 can have a pixel location 816 within the input image 212 represented by coordinates along the x-axis 214 and the y-axis 216. The pixel location 816 is defined as the location of the pixels relative to a fixed point in the image. The pixel location 816 of each of the input pixels 810 can be assigned according to the input rows 812 and the input columns 814 relative to the image origin 218.

For example, one of the input pixels 810 located in the first one of the input rows 812 and the first one of the input columns 814, corresponding to the lower left corner of the input image 212, can have the pixel location 816 of (1, 1). As a further example, one of the input pixels 810 located in the "$n^{th}$" one of the input columns 814 and the "$m^{th}$" one of the input rows 812, corresponding to the upper right corner of the input image 212, can have the pixel location 816 of (n, m).

Each of the input pixels 810 can exhibit a pixel intensity 818. The pixel intensity 818 is defined as the brightness or energy of a pixel in an image. A low value of the pixel intensity 818 can represent a low brightness or energy. Similarly, high value of the pixel intensity 818 can represent a high brightness or energy.

For instance, in a gray scale image, the pixel intensity 818 can be set relative to black and white. For example, the color black can represent the lowest level of the pixel intensity 818.

As a specific example, the input pixels 810 having a low value for the pixel intensity 818 can be closer to the color black. Conversely, the color white can represent the highest level of the pixel intensity 818. As a specific example, the input pixels 810 having a high value for the pixel intensity 818 can be closer to the color white.

In another specific example, the pixel intensity 818 can be used to represent the intensity of objects in the input image 212. In this example, the input pixels 810 representing the sun can have a high value of the pixel intensity 818 while the input pixels 810 representing a night sky or a shadow can have a low value of the pixel intensity 818.

The display system 100 can include an intensity filter module 880, coupled to the first control unit 312. The intensity filter module 880 is for identifying pixels in regions having high variation in intensity and generating a map of pixels processed to filter pixels in regions having high variation in intensity. Each of these functions will be described in detail below: The intensity filter module 880 can receive the input image 212.

The intensity filter module 880 can generate an intensity filtered map 882 from the input pixels 810. The intensity filtered map 882 of pixels processed to filter pixels in regions having high variation in intensity. The intensity filtered map 882 can identifies pixels in regions of low variation in pixel intensity. The intensity filtered map 882 can be a two-dimensional array having the same number of rows and columns as the input image 212.

The intensity filtered map 882 can map the location of intensity filtered pixels 884. The intensity filtered pixels 884 are defined as pixels in regions having low variation in intensity:

The intensity filtered map 882 can include intensity entries 886. The intensity entries 886 are defined as entries on a map corresponding to the location of pixels in an image. The intensity entries 886 can represent location of the intensity filtered pixels 884. The location of the intensity entries 886 in the intensity filtered map 882 can correspond with the pixel location 816 of the intensity filtered pixels 884 in the input image 212.

The display system 100 can include an image edge module 820. The image edge module 820 is for detecting pixels representing an edge or a boundary between portions of an image having differences in the image properties and generating a map of the edge pixels. The image edge module 820 can perform these functions with an edge detection module 822 and an edge map module 824. The image edge module 820 can be coupled to the first control unit 312 of FIG. 3.

The edge detection module 822 is for identifying pixels representing edges between different regions or portions of an image. The edge detection module 822 can be coupled to the image edge module 820.

The edge detection module 822 can receive the input image 212. The edge detection module 822 can identify input edge pixels 826 in the input image 212. The input edge pixels 826 are defined as the pixels representing the edge between two regions in an image. For example, the input edge pixels 426 can represent the image edge 224 of FIG. 2 between the first image region 220 of FIG. 2 and the second image region 222 of FIG. 2. As a specific example, the input edge pixels 826 can represent the image edge 224 between the input pixels 810 representing objects such as the sky and other ones of the input pixels 810 representing clouds or mountains.

The edge detection module 822 can identify the input edge pixels 826 in the input image 212 using a variety of edge detection operations 828. The edge detection operations 828 are defined as processes or methods for identifying edge pixels in an image. For example, the edge detection operations 828 can include the Sobel operator, Canny edge detection, sub-sampling, Sobel-Max masking, principal component analysis (PCA), LaPlacian zero crossing, linking, differential edge detection, the Marr-Hildreth operator, phase congruency, or a combination thereof. As a further example, the edge detection operations 828 can include gradient and threshold operations.

The edge map module 824 is for generating a map of edge pixels in an image. The edge map module 824 can be coupled to the edge detection module 822.

The edge map module 824 can generate an input edge map 830 with the input edge pixels 826. The input edge map 830 is defined as the map of the location of the edge pixels in an image. The input edge map 830 can be a two-dimensional array having the same number of rows and columns as the input image 212.

The edge map module 824 can generate the input edge map 830 by generating edge entries 832 corresponding to each of the input edge pixels 826 in the input image 212. The edge entries 832 are defined as entries on a map corresponding to edge pixels in an image. The location of the edge entries 832 in the input edge map 830 can correspond with the pixel location 816 of the input edge pixels 826 in the input image 212.

The edge map module 824 can generate the one of the edge entries 832 as "one" corresponding to the pixel location 816 of one of the input pixels 810 when the edge detection module 822 identifies one of the input edge pixels 826. Conversely, if the edge detection module 822 does not identify one of the input pixels 810 as one of the input edge pixels 826, the edge map module 824 can generate the corresponding one of the edge entries 832 as "zero".

The display system 100 can include an edge prune module 870. The edge prune module 870 can be coupled to the image edge module 820. The edge prune module 870 is for processing a map of edge pixels with an edge pixel pruning operation to remove scattered or isolated edge pixels and edge pixels surrounded by a high number of other edge pixels as determined by a threshold. As an example, the threshold for determining a high number of edge pixels can be determined heuristically. Each of these functions will be discussed in detail below.

The edge prune module 870 can generate a pruned edge map 872 from the input edge map 830. The pruned edge map 872 is defined as the map of edge pixels processed to remove scattered or isolated edge pixels and edge pixels surrounded by a high number of other edge pixels. The pruned edge map 872 can be a map of pruned edge pixels 874. The pruned edge pixels 874 are defined as pixels remaining after an edge pixel pruning operation to remove scattered or isolated edge pixels and edge pixels surrounded by a high number of other edge pixels.

The display system 100 can include a map combination module 888. The map combination module 888 is for combining processed pixel maps to identify pruned edge pixels in areas of an image having low variation in intensity. The map combination module 888 can be coupled to the edge prune module 870, the intensity filter module 880, or a combination thereof.

The map combination module 888 can identify intensity filtered edge pixels 890. The intensity filtered edge pixels 890 are defined as edge pixels in areas of low intensity variation and that have been processed by an edge pixel pruning operation to remove scattered or isolated edge pixels and edge pixels surrounded by a high number of other edge pixels.

The map combination module 888 can identify the intensity filtered edge pixels 890 based on a combination of entries representing the location of the pruned edge pixels 874 and the intensity filtered pixels 884. For example, the map combination module 888 can identify the intensity filtered edge pixels 890 as a non-zero product of the edge entries 832 of the input edge map 830 and the intensity entries 886 of the intensity filtered map 882, both corresponding to one of the input pixels 810. For example, the map combination module 888 can identify the intensity filtered edge pixels 890 when the product of one of the edge entries 832 and one of the intensity entries 886 is "one."

As an example, the map combination module 888 can calculate the intensity filtered edge pixels 890 based on the pruned edge pixels 874 and the intensity filtered pixels 884 according to equation 6, as follows:

$$e_s(x,y) = \delta(x,y) \times e_p(x,y) \quad \text{equation 6}$$

The intensity filtered edge pixels 890 can be represented as "$e_s(\ )$". The pruned edge pixels 874 can be represented as "$e_p(\ )$". The intensity filtered pixels 884 can be represented as "$\delta(\ )$".

A line transform module 834 can be coupled to the edge detection module 822. The line transform module 834 is for generating lines between pixel and calculating a transform coordinate for a point along the line. These functions can be performed with a line segment module 836 and a location transform module 838.

The line segment module 836 is for generating a line between two pixels in an image. The line segment module 836 can generate candidate lines 840 between one of the input edge pixels 826 and another one of the input edge pixels 826. The candidate lines 840 are defined as a straight line between two edge pixels.

As an example, the line segment module 836 can generate the candidate lines 840 between adjacent pairs of the input edge pixels 826 in the input image 212. In another example, the line segment module 836 can generate the candidate lines 840 between pairs of the input edge pixels 826 spaced apart by one or more intervening pixels. As a further example, the line segment module 836 can generate one or more lines between one of the input edge pixels 826 and another one of the input edge pixels 826.

The candidate lines 840 can be described by the equation 7:

$$y = m^*x + b \quad \text{equation 7}$$

The variable "y" can represent the input columns 814 of one of the input pixels 810. The variable "x" can represent the input rows 812 of one of the input pixels 810. The variable "m" can represent the slope of the line between two of the input pixels 810. The variable "b" can represent the x-intercept of the line.

The candidate lines 840 can have an edge direction 842. The edge direction 842 is defined as the angle measured between the positive side of the x-axis 214 and the candidate lines 840. As an example, the edge direction 842 can have a range of $(-\pi + \pi)$.

The location transform module 838 is for converting the coordinates representing a point on a line in one coordinate system to analogous coordinates in a different coordinate system with a transform operation. The location transform module 838 can calculate a transform location 844 from the pixel location 816 and one of the candidate lines 840 associated with the input edge pixels 826.

The transform location 844 is defined as a coordinate representing a point on a line that has undergone a transform operation. As an example, the transform location 844 can be calculated by a coordinate transform operation, such a Hough transform.

The transform location 844 can be calculated based on a perpendicular transform segment 846. The perpendicular transform segment 846 is defined as a line segment that passes through the origin of a coordinate system and is perpendicular to a line connecting two pixels in an image. The location transform module 838 can calculate the perpendicular transform segment 846 as a line perpendicular with the candidate lines 840 associated with one of the input edge pixels 826 and passing through the image origin 218.

For the candidate lines 840 associated with one of the input edge pixels 826 having the pixel location 816 of $(x_o, y_o)$, the perpendicular transform segment 846 can be calculated according to equation 8:

$$\rho = x_o^* \cos\theta + y_o^* \sin\theta \quad \text{equation 8}$$

The variable $\rho$ (rho) is a coordinate length 848 of the perpendicular transform segment 846. The coordinate length 848 is defined as the length of the perpendicular transform segment 846 between the candidate lines 840 and the image origin 218. As an example, the coordinate length 848 can have a range of $(-\infty + \infty)$.

The variable $\theta$ (lower case theta) is a coordinate angle 850 of the perpendicular transform segment 846. The coordinate angle 850 is defined as the angle measured between the perpendicular transform segment 846 and the positive side of x-axis 214. As an example, the coordinate angle 850 can have a range of $(-\pi + \pi)$.

The coordinate angle 850 can be calculated according to equation 9:

$$\theta = 90° - \Theta \quad \text{equation 9}$$

The variable $\Theta$ (upper case theta) is the edge direction 842 of the candidate lines 840 for one of the input edge pixels 826.

The transform location 844 can be represented as the coordinate length 848 and the coordinate angle 850 of the perpendicular transform segment 846 associated with one of the input edge pixels 826. For example, the input edge pixels 826 having the pixel location 816 of $(x_o, y_o)$ can have the transform location 844 of $(\rho_o, \theta_o)$.

The display system 100 can include an edge histogram module 852. The edge histogram module 852 is for generating a chart or graph of the distribution of coordinate associated with edge pixels from an image. The edge histogram module 852 can be coupled to the line transform module 834.

The edge histogram module 852 can generate an edge coordinate histogram 854 from the coordinate length 848 and the coordinate angle 850 for each of the candidate lines 840 associated with the intensity filtered edge pixels 890.

The edge coordinate histogram 854 is defined as a two dimensional histogram that quantifies the number of pixels having similar transform coordinates. The first dimension of the edge coordinate histogram 854 can represent values of the coordinate length 848 and the second dimension of the edge coordinate histogram 854 can represent values of the coordinate angle 850.

The edge coordinate histogram 854 can have histogram bins 856 representing the candidate lines 840. The histogram bins 856 can correspond to a specific combination of one of the coordinate length 848 and the coordinate angle 850 or a small range including more than one of the coordinate length 848 and the coordinate angle 850.

For example, the one of the histogram bins 856 can correspond to the coordinate length 848 of "five" and the coordinate angle 850 of "twenty degrees." As another example, one of the histogram bins 856 can represent a range of values for the coordinate length 848, such as "four to six," and a range of values for the coordinate angle 850, such as "nineteen degrees to twenty one degrees."

The edge histogram module 852 can generate the edge coordinate histogram 854 by summing the transform location 844 for the intensity filtered edge pixels 890 that correspond to a particular one of the histogram bins 856. For example, if the candidate lines 840 for one of the intensity filtered edge pixels 890 has the transform location 844 corresponding to one of the histogram bins 856, then the edge histogram module 852 can increase the histogram count for the one of the histogram bins 856.

The edge histogram module 852 can include local maxima bins 858. The local maxima bins 858 are defined as the bins in a histogram having the histogram counts in the histogram. The edge coordinate histogram 854 can have one or more of the local maxima bins 858.

The display system 100 can include a line selection module 860. The line selection module 860 is for selecting the lines based on local maxima in a histogram. The line selection module 860 can select the dominant image lines 226 of FIG. 2 as the candidate lines 840 corresponding to the local maxima bins 858 of the edge coordinate histogram 854. The local maxima bins 858 can be based on the candidate lines 840 calculated between the pruned edge pixels 874.

As an example, the line selection module 860 can select one or more of the dominant image lines 226 when one or more of the local maxima bins 858 are identified by the line selection module 860. As a specific example, the line selection module 860 can select the dominant image lines 226 as the candidate lines 840 corresponding to the local maxima bins 858 having the highest histogram counts.

The dominant image lines 226 can be used to generate a processed image based on the input image 212. For example, the vanishing point 230 of FIG. 2 and the vanishing lines of FIG. 2 can be determined from the dominant image lines 226 for use in two-dimension to three-dimension image conversion.

In an example for the first device 102 of FIG. 3, the first software 326 of FIG. 3 of the first device 102 can include the display system 100. For example, the image edge module 820, the edge detection module 822, the edge map module 824, the line transform module 834, the line segment module 836, the edge histogram module 852, the line selection module 860, the intensity filter module 880, the edge prune module 870, and the map combination module 888, can be stored in the first software 326 and coupled to the first control unit 312.

The first control unit 312 can execute the first software 326. For example, the first control unit 312 of can execute the edge detection module 822 to identify the input edge pixels 826 from the input pixels 810 with the edge detection operations 828.

In an example for the second device 106 of FIG. 3, the second software 342 of FIG. 3 can include the display system 100. For example, the image edge module 820, the edge detection module 822, the edge map module 824, the line transform module 834, the line segment module 836, the edge histogram module 852, the line selection module 860, the intensity filter module 880, the edge prune module 870, and the map combination module 888, can be stored in the second software 342 and coupled to the second control unit 334.

The second control unit 334 can execute the first software 326. For example, the second control unit 334 of can execute the edge detection module 822 to identify the input edge pixels 826 from the input pixels 810 with the edge detection operations 828.

In another example, the display system 100 can be partitioned between the first software 326 and the second software 342. For example, the first software 326 can include the image edge module 820, the edge detection module 822, the edge map module 824, the line transform module 834, and the line segment module 836. The second software 342 can include the edge histogram module 852, the line selection module 860, the intensity filter module 880, the edge prune module 870, and the map combination module 888. The second control unit 334 can execute modules partitioned on the second software 342 and the first control unit 312 can execute modules partitioned on the first software 326.

The modules described for this control flow can be implemented in hardware depending on the context of usage. The context of usage can also be determined by the usage in claims later in this application. For example, in the system or apparatus claims, the modules are to be construed to be implemented in hardware. The modules can be part of the hardware functional units in FIG. 3, as such separate hardware state machines or hardware accelerator blocks to the first control unit 312 of FIG. 3 or the second control unit 334 of FIG. 3, The modules can also be implemented as discrete hardware blocks within the first device 102 of FIG. 3 or the second device 106 of FIG. 3.

The display system 100 describes the module functions or order as an example. The modules can be partitioned differently. For example, the edge detection module 822 can be stored in the second storage unit 346 and the first software 326 can include the edge map module 824. Each of the modules can operate individually and independently of the other modules.

Furthermore, data generated in one module can be used by another module without being directly coupled to each other. For example, the line transform module 834 can receive the input image 212.

It has been discovered that the present invention provides the display system 100 with the edge prune module 870 having improved accuracy in selection of the dominant image lines 226. The edge prune module 870 identifies the pruned edge pixels 874 which reduces the number of candidate lines 840 that can represent false edges or false lines, thus improving the accuracy in selection of the dominant image lines 226.

It has also been discovered that the present invention provides the display system 100 the intensity filtered edge pixels 890 having improved accuracy in selection of the dominant image lines 226. The combination of the intensity filtered map 882 and the pruned edge map 872 to identify the intensity filtered edge pixels 890 reduces the number of candidate lines 840 that can represent false edges or false lines, thus improving the accuracy in selection of the dominant image lines 226.

The physical transformation from displaying the input image 212 results in movement in the physical world, such as people moving in response to the input image 212 when playing games or viewing a three dimensional image. The first display interface 330 can display the input image 212 by manipulating the pixels on the first device 102 causing the players or viewers to move in response to the input image 212, thus resulting in movement in the physical world.

Figure 9:
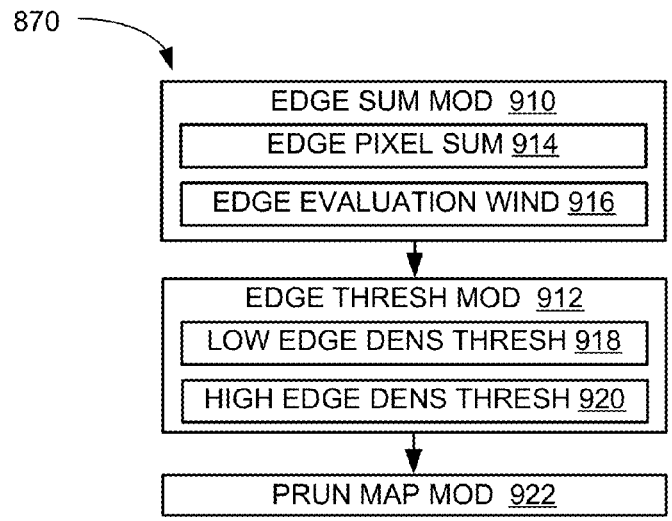
FIG. 9 is a detailed view of the edge prune module.

Referring now to FIG. 9, therein is shown a detailed view of the edge prune module 870. The edge prune module 870 can identify the pruned edge pixels 874 of FIG. 8 with an edge sum module 910 and an edge threshold module 912.

The edge sum module 910 is for calculating the number of edge pixels surrounding a specific edge pixel within a region of the image. The edge sum module 910 can be coupled to the edge prune module 870.

The edge sum module 910 can calculate an edge pixel sum 914 for each of the input edge pixels 826 in the input image 212 of FIG. 2. The edge pixel sum 914 is defined as the total number of the input edge pixels 826 of FIG. 8 surrounding one of the input edge pixels 826 within an edge evaluation window 916.

The edge evaluation window 916 is defined as a region or group of pixels surrounding a single pixel or a group of pixels. The edge evaluation window 916 can include a pre-determined or variable number of the input rows 812 of FIG. 8 of the input pixels 810 above and below the one of the input edge pixels 826. Similarly, the edge evaluation window 916 can extend a pre-determined or variable number of the input columns 814 of FIG. 8 of the input pixels 810 to the right and to the left of one of the input edge pixels 826. As an example, the number of the input rows 812 and the input columns 814 in the edge evaluation window 916 can be determined heuristically. The edge evaluation window 916 can be centered around one of the input edge pixels 826 for calculation of the edge pixel sum 914.

The edge sum module 910 can calculate the edge pixel sum 914 for the one of the input edge pixels 826 at the center of the edge evaluation window 916 by summing the total number of the input edge pixels 826 within the edge evaluation window 916. For example if one of the input pixels 810 in the edge evaluation window 916 corresponds to one of the input edge pixels 826, the edge sum module 910 can increase the value of the edge pixel sum 914 by one. Conversely, if one of the input pixels 810 in the edge evaluation window 916 does not corresponds to one of the input edge pixels 826, the edge sum module 910 will not increase the value of the edge pixel sum 914.

The edge threshold module 912 is for identifying pixels that are between a high pixel density and low pixel density threshold. The edge threshold module 912 can identify the pruned edge pixels 874 from the input edge pixels 826 by determining if the edge pixel sum 914 of one of the input edge pixels 826 is between a low edge density threshold 918 and a high edge density threshold 920. The edge threshold module 912 can be an edge pixel pruning operation. The edge threshold module 912 can be coupled to the edge prune module 870.

The low edge density threshold 918 is defined as a threshold for determining if an edge pixel is in a region having a low edge pixel density or a low number of edge pixels relative to the total number of pixels. The low edge density threshold 918 can be determined heuristically or can be a predetermined value or a value within a range of values, such as 25 to 50 of the input edge pixels 826 to the total number of the input pixels 810.

As an example, the low density of the input edge pixels 826 can represents areas or regions in the input image 212 where the input edge pixels 826 are sparse or scattered. In this example, the regions having a low pixel density of the input edge pixels 826 can include objects in the input image 212 of FIG. 2, such as long hair on a person's head or the leaves and petals in a bouquet of flowers.

In another example, a low density of the input edge pixels 826 in a region or area of the input image 212 can indicate noise or the existence of objects with complex textures and geometric shapes, which may not have any straight lines but only chunks or groups of strong or jagged edges. As a further example, the existence of regions or areas of the input image 212 having a low density of the input edge pixels 826 can contribute to problems in subsequent image processing, such as detection of false, scattered or segmented line and 2D to 3D conversion.

The high edge density threshold 920 is defined as a threshold for determining if an edge pixel is in a region having a high edge pixel density or a high number of edge pixels relative to the total number of pixels. The high edge density threshold 920 can be determined heuristically or can be a predetermined value or a value within a range of values.

As an example, the high density of the input edge pixels 826 can represents areas or regions in the input image 212 where the input edge pixels 826 are homogenous and high in number relative to the total number of the input pixels 810. In this example, the high density of the input edge pixels 826 can represent gradually changing areas in the input image 212 where the boundary between the input pixels 810 of FIG. 8 representing objects such as white clouds and a light blue sky.

In another example, a high density of the input edge pixels 826 in a region or area of the input image 212 can indicate the existence of chunky or wide edges. As a further example, the existence of regions or areas of the input image 212 having a high density of the input edge pixels can result in inaccurate calculation of the transform location 844 of FIG. 8, which includes the coordinate length 848 of FIG. 8 and the coordinate angle of FIG. 8, for the input edge pixels 826.

The edge prune module 870 can generate the pruned edge map 872 of FIG. 8 with a pruned map module 922. The pruned map module 922 is for removing scattered or isolated edge pixels and edge pixels surrounded by a high number of other edge pixels in an edge pixel map.

For example, the pruned map module 922 can remove the input edge pixels 826 in regions of the input image 212 having a high or low number of the input edge pixels 826 from the input edge map 830. The pruned map module 922 can be coupled to the edge prune module 870.

The pruned map module 922 can generate the pruned edge map 872 by modifying the edge entries 832 of FIG. 8 of the input edge pixels 826 that were not identified as the pruned edge pixels 874. For example, if the edge threshold module 912 does not identify one of the input edge pixels 826 as one of the pruned edge pixels 874, then the pruned map module 922 can change the corresponding one of the edge entries 832 from "one" to "zero." The edge entries 832 having the value of "zero" signifies that the corresponding input edge pixel is not one of the pruned edge pixels 874.

Conversely, if the edge threshold module 912 identifies one of the input edge pixels 826 as one of the pruned edge pixels 874, then the pruned map module 922 will not change the corresponding one of the edge entries 832. Modifying the edge entries 832 of the input edge pixels 826 that were not identified as the pruned edge pixels 874 can be a process of removing scattered or isolated edge pixels and edge pixels surrounded by a high number of other edge pixels.

It has been discovered that the present invention provides the display system 100 having improved edge thinning with the pruned edge map 872. Generating the pruned edge map 872 with the high edge density threshold 920 can remove the input edge pixels 826 in region or area of the input image 212 having chunky or wide edges thus providing improved edge thinning and improved accuracy for subsequent image processing.

It has also been discovered that the present invention provides the display system 100 having improved edge thinning with the pruned edge map 872. Generating the pruned edge map 872 with the low edge density threshold 918 can remove the input edge pixels 826 in region or area of the input image 212 having signal noise or the objects with complex textures and geometric shapes thus providing improved edge thinning and improved accuracy for subsequent image processing.

Figure 10:
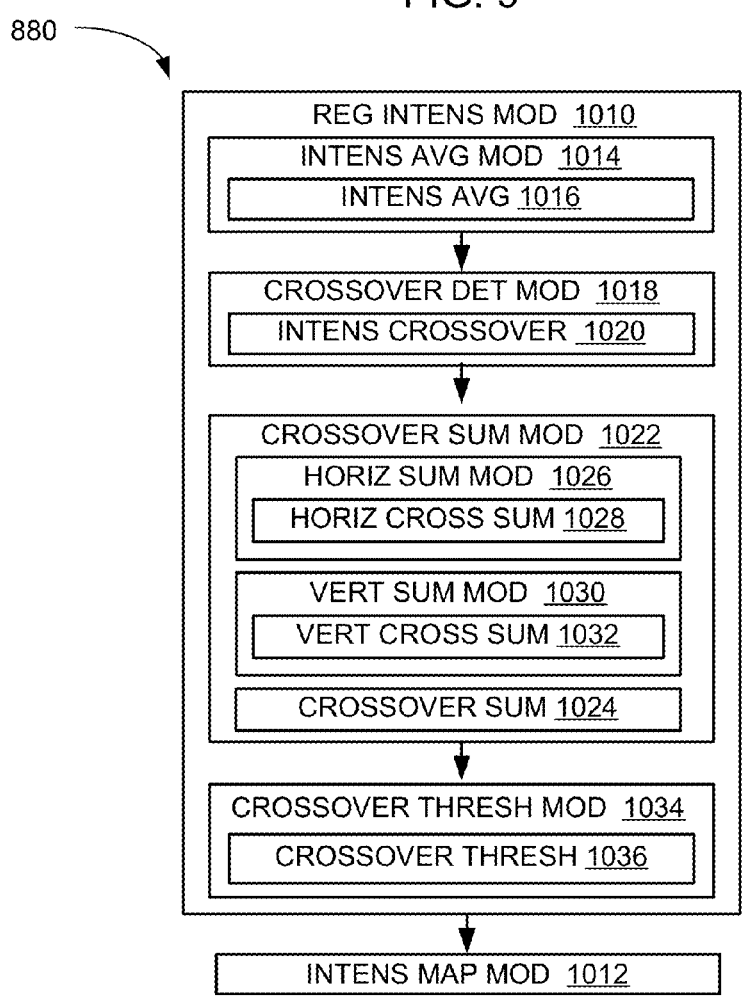
FIG. 10 is a detailed view of the intensity filter module.

Referring now to FIG. 10, therein is shown a detailed view of the intensity filter module 880. The intensity filter module 880 can include a region intensity module 1010 and an intensity map module 1012.

The region intensity module 1010 is for identifying pixels in regions having high variation in pixel intensity. The region intensity module 1010 can include an intensity average module 1014, a crossover detection module 1018, a crossover sum module 1022, and a crossover threshold module 1034. The region intensity module 1010 can be coupled to the intensity filter module 880.

The intensity average module 1014 is for calculating an average of the intensity values for group of pixels in an image. The intensity average module 1014 can be coupled to the intensity filter module 880.

The intensity average module 1014 can calculate an intensity average 1016 for a group or subset of the input pixels 810 of FIG. 8 of the input image 212 of FIG. 2. The intensity average 1016 is defined as a mathematical average of intensity values for a group of pixels in an image. The intensity average module 1014 can calculate the intensity average 1016 by summing the pixel intensity 818 of FIG. 8 for each of the input pixels 810 within the group of the input pixels 810 divided by the total number of the input pixels 810 in the group. For example, the intensity average 1016 can be calculated based on all of the input pixels 810 in the particular one of the input rows 812 or the input columns 814 or can be calculated on a subset of the input pixels 810 within the particular one of the input rows 812 or the input columns 814.

The crossover detection module 1018 is for detecting when adjacent pixels have intensity values on opposing sides of an average intensity value. The crossover detection module 1018 can be coupled to the intensity filter module 880.

The crossover detection module 1018 can detect intensity crossovers 1020 between two of the input pixels 810 that are directly adjacent to one another. The intensity crossovers 1020 are defined as instances when intensity values for directly adjacent pixels are on opposing sides of an average intensity value.

The crossover detection module 1018 can detect the intensity crossovers 1020 by comparing the pixel intensity 818 of two of the input pixels 810 that are directly adjacent to one another with the intensity average 1016. For example, the crossover detection module 1018 can detect one of the intensity crossovers 1020 when one of the input pixels 810 has a value of the pixel intensity 818 below the intensity average 1016 and a directly adjacent one of the input pixels 810 has a value of the pixel intensity 818 above the intensity average 1016.

The crossover sum module 1022 is for determining the number of intensity crossovers 1020 for a series of pixels. The crossover sum module 1022 can be coupled to the intensity filter module 880.

The crossover sum module 1022 can select a crossover sum 1024 for each of the input pixels 810 from a horizontal cross sum 1028 and a vertical cross sum 1032. The crossover sum 1024 is defined the total number of the intensity crossovers 1020 within a range of a specific pixel.

The horizontal cross sum 1028 is defined as the number of the intensity crossovers 1020 within a horizontal range of a specific pixel. A horizontal sum module 1026, coupled to the crossover sum module 1022, can calculate the horizontal cross sum 1028 by summing the number of the intensity crossovers 1020 between each of the input pixels 810 within the input rows 812 of FIG. 8 of a specific one of the input pixels 810. For example, if the crossover detection module 1018 detects the intensity crossovers 1020 between a horizontally adjacent pair of the input pixels 810, the horizontal sum module 1026 can increase the value of the horizontal cross sum 1028 by one.

The horizontal sum module 1026 can calculate the horizontal cross sum 1028 for the input rows 812 or for a specific number of the input pixels 810 horizontally adjacent to the specific one of the input pixels 810. For example, the horizontal sum module 1026 can sum the intensity crossovers 1020 between two or more of the input pixels 810 to the right and the left of the specific one of the input pixels 810. In a specific example, the horizontal sum module 1026 can calculate the horizontal cross sum 1028 for 5 to 7 of the input pixels 810 to the left and to the right of the specific one of the input pixels 810.

The vertical cross sum is defined as the number of the intensity crossovers 1020 within a vertical range of a specific pixel. A vertical sum module 1030, coupled to the crossover sum module 1022, can calculate the vertical cross sum 1032 by summing the number of the intensity crossovers 1020 between each of the input pixels 810 within the input columns 814 of a specific one of the input pixels 810. For example, if the crossover detection module 1018 detects the intensity crossovers 1020 between a vertically adjacent pair of the input pixels 810, the vertical sum module 1030 can increase the value of the vertical cross sum 1032 by one.

The vertical sum module 1030 can calculate the vertical cross sum 1032 for the input rows 812 or for a specific number of the input pixels 810 vertically adjacent to the specific one of the input pixels 810. For example, the vertical sum module 1030 can sum the intensity crossovers 1020 between two or more of the input pixels 810 above and below the specific one of the input pixels 810. In a specific example, the horizontal sum module 1026 can calculate the horizontal cross sum 1028 for 5 to 7 of the input pixels 810 above and below the specific one of the input pixels 810.

The crossover sum module 1022 can compare the horizontal cross sum 1028 and the vertical cross sum 1032 and select the crossover sum 1024 as the one having the highest value. For example, if the horizontal cross sum 1028 is greater than the vertical cross sum 1032, the crossover sum module 1022 will select the crossover sum 1024 as the horizontal cross sum 1028. As a further example, the crossover sum module 1022 can select the crossover sum 1024 as a sum of the horizontal cross sum 1028 and the vertical cross sum 1032.

In yet a further example, the crossover sum module 1022 can select the crossover sum 1024 based on a diagonal line of the input pixels 810. As a specific example, the diagonal can be based on the angle or direction of the candidate lines 840 associated with one of the input edge pixels 826.

The region intensity module 1010 can identify the intensity filtered pixels 884 of FIG. 8 with the crossover threshold module 1034. The crossover threshold module 1034 is for comparing a value to a threshold. The crossover threshold module 1034 can be coupled to the region intensity module 1010.

The crossover threshold module 1034 can comparing the crossover sum 1024 of each of the input pixels 810 to a crossover threshold 1036. The crossover threshold 1036 is defined as a threshold value for determining if a pixel is in a region of high intensity variation or low intensity variation. For example, values above the crossover threshold 1036 are considered as pixels in regions having high intensity variations. As a further example, values below the crossover threshold 1036 are considered as pixels in regions having low intensity variations. The region intensity module 1010 can identify the intensity filtered pixels 884 as the input pixels 810 having the crossover sum 1024 below the crossover threshold 1036.

The intensity filter module 880 can generate the intensity filtered map 882 with the intensity map module 1012. The intensity map module 1012 is for mapping the location of filtered pixels in an image. The intensity map module 1012 can be coupled to the intensity filter module 880.

The intensity map module 1012 can generate the intensity filtered map 882 by generating the intensity entries 886 corresponding to each of the input pixels 810 in the input image 212. For example, if the region intensity module 1010 identifies one of the input pixels 810 as one of the intensity filtered pixels 884, then the intensity map module 1012 can set the intensity entries 886 corresponding to that specific one of the input pixels 810 as "one": Conversely, if the region intensity module 1010 does not identify one of the input pixels 810 as one of the intensity filtered pixels 884, then the intensity map module 1012 can set the intensity entries 886 corresponding to that specific one of the input pixels 810 equal to "zero".

As an example, the intensity map module 1012 can set the intensity entries 886 according to equation 10, as follows:

$$\delta(x, y) = \begin{cases} 1 & \text{if } \max(S_V, S_H) \le K \\ 0 & \text{otherwise.} \end{cases} \quad \text{equation 10}$$

The intensity entries 886 of FIG. 8 for the input pixels 810 can be represented by "$\delta(\ )$". The vertical cross sum 1024 can be represented by "$s_V$". The horizontal cross sum 1028 can be represented by "$S_H$". The crossover threshold 1036 can be represented as "K".

It has been discovered that the present invention provides the display system 100 having improved noise reduction in the input image 212. The generation of the intensity filtered map 882 provides a pixel map that removes the input pixels 810 in areas having high variations in the pixel intensity 818 which improves noise reduction in the input image 212.

It has also been discovered that the present invention provides the display system 100 having improved noise reduction in the input image 212. The identification of the intensity filtered pixels 884 with the crossover threshold 1036 removes the input pixels 810 in areas having high variations in the pixel intensity 818 which improves noise reduction in the input image 212.

It has further been discovered that the present invention provides the display system 100 having improved noise reduction in the input image 212. The identification of the intensity filtered pixels 884 with the crossover detection module 1018 improves identification of regions in the image having high variations in the pixel intensity 818 which improves noise reduction in the input image 212.

Figure 11:
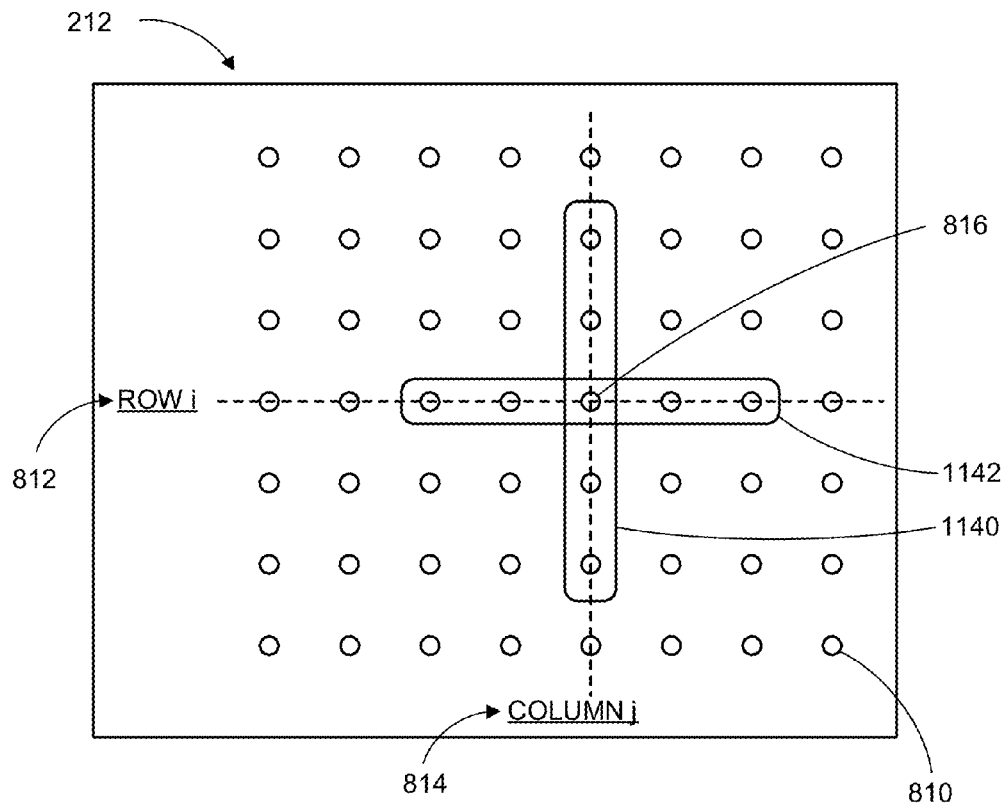
FIG. 11 is an example illustration of the crossover sum module.

Referring now to FIG. 11, therein is an example illustration of the crossover sum module 1022 of FIG. 10. FIG. 11 depicts portion of the input image 212 including a group of the input pixels 810, as depicted by the open circles. The portion of the input image 212 can illustrate one of the input pixels 810 located in the input rows 812 "i" and the input columns 814 "j," as depicted by the dashed lines, and corresponding to the pixel location 816 of (j, i).

The crossover sum module 1022, having the vertical sum module 1030 of FIG. 10 and the horizontal sum module 1026 of FIG. 10, can sum the number of instances of the intensity crossovers 1020 of FIG. 10. For example, the vertical sum module 1030 can sum the number of instances of the intensity crossovers 1020 within a vertical range 1140 of the input pixels 810 having the pixel location 816 of (j, i), as depicted by the vertically oriented rectangle. Similarly, for example, the horizontal sum module 1026 can sum the number of instances of the intensity crossovers 1020 within a horizontal range 1142 of the input pixels 810 having the pixel location 816 of (j, i), as depicted by the horizontally oriented rectangle.

For illustrative purposes, the horizontal range 1142 can include two of the input pixels 810 above and below the input pixels 810 having the pixel location 816 of (j, i), although it is understood that the horizontal range 1142 can include more or less than two of the input pixels 810. Similarly, for illustrative purposes, the vertical range 1140 can include two of the input pixels 810 to the left and the right of the input pixels 810 having the pixel location 816 of (j, i), although it is understood that the vertical range 1140 can include more or less than two of the input pixels 810.

Figure 12:
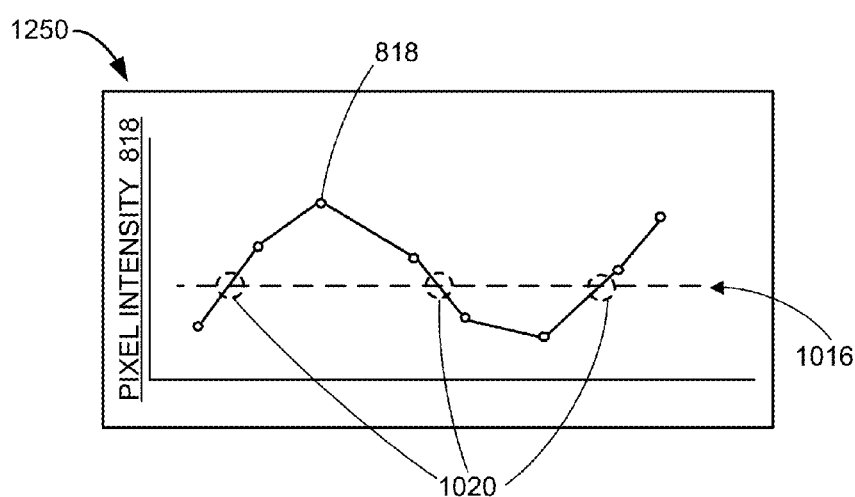
FIG. 12 is a chart of an example illustration of the crossover detection module of FIG. 10.

Referring now to FIG. 12, therein is shown a chart 1250 of an example illustration of the crossover detection module 1018 of FIG. 10. The chart 1250 can have a vertical axis representing a measure of the pixel intensity 818. The chart 1250 can depict the pixel intensity 818 for a series of adjacent ones of the input pixels 810 of FIG. 8, as depicted by the solid circles and the intensity average 1016, as depicted by the dashed line.

The chart 1250 illustrates the intensity crossovers 1020, as depicted by the dashed circles, by the intercept of the solid lines, which connect the adjacent one of the input pixels 810, and the intensity average 1016. For illustrative purposes, the chart 1250 shows the series of adjacent ones of the input pixels 810 having three of the intensity crossovers 1020. As an example, the crossover detection module 1018 of FIG. 10 can calculate the crossover sum 1024 of FIG. 10 as three.

Figure 13:
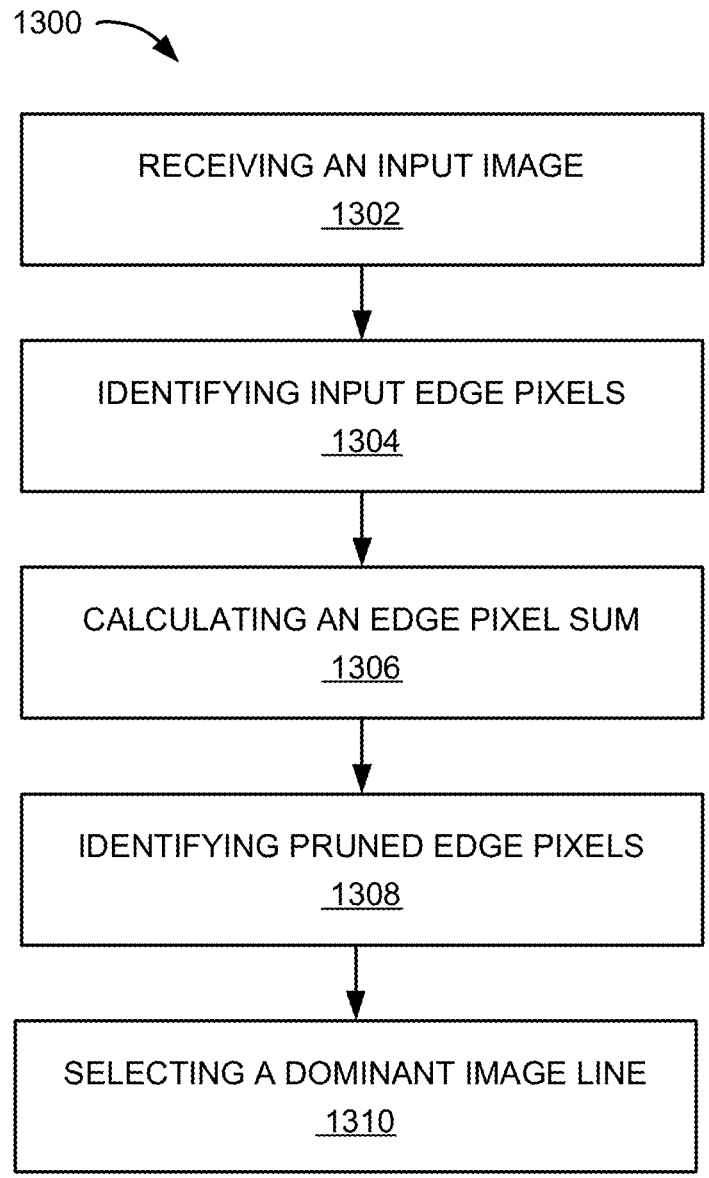
FIG. 13 is a flow chart of a method of operation of a display system in a further embodiment of the present invention.

Referring now to FIG. 13, therein is shown a flow chart of a method 1300 of operation of a display system in a further embodiment of the present invention. The method 1300 includes: receiving an input image having input pixels in a block 1302; identifying input edge pixels from the input pixels in a block 1304; calculating an edge pixel sum for one of the input edge pixels based on the number of the input edge pixels surrounding one of the input edge pixels in a block 1306; identifying pruned edge pixels from the input edge pixels having the edge pixel sum between a high edge density threshold and a low edge density threshold in a block 1308; and selecting a dominant image line from candidate lines calculated between the pruned edge pixels to generate a processed image for displaying on a device in a block 1310.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or

What is claimed is:

1. A method of operation of a display system comprising:
receiving an input image having input pixels;
identifying input edge pixels from the input pixels;
calculating an edge pixel sum for one of the input edge pixels based on the number of the input edge pixels surrounding one of the input edge pixels;
identifying pruned edge pixels from the input edge pixels having the edge pixel sum between a high edge density threshold and a low edge density threshold; and
selecting a dominant image line from candidate lines calculated between the pruned edge pixels based on an intensity filtered edge pixel to generate a processed image for displaying on a device.

2. The method as claimed in claim 1 wherein calculating the edge pixel sum includes calculating the edge pixel sum for a single one of the input edge pixels within an edge evaluation window.

3. The method as claimed in claim 1 further comprising identifying an intensity filtered pixel based on variations of a pixel intensity of the input pixels in a region of the input image for identification of the intensity filtered pixel.

4. The method as claimed in claim 1 further comprising identifying an intensity filtered edge pixel based on the pruned edge pixels for identification of the intensity filtered pixel.

5. The method as claimed in claim 1 further comprising:
generating an edge coordinate histogram having a local maxima bin representing the candidate lines; and
wherein selecting the dominant image line includes selecting the dominant image line as the candidate lines associated with the local maxima bin.

6. A method of operation of a display system comprising:
receiving an input image having input pixels;
generating an input edge map of input edge pixels from the input pixels;
calculating an edge pixel sum for one of the input edge pixels based on the number of the input edge pixels surrounding one of the input edge pixels;
identifying pruned edge pixels from the input edge pixels having the edge pixel sum between a high edge density threshold and a low edge density threshold;
generating a pruned edge map of the pruned edge pixels from the input edge map; and
selecting a dominant image line from candidate lines calculated between the pruned edge pixels based on an intensity filtered edge pixel to generate a processed image for displaying on a device.

7. The method as claimed in claim 6 wherein generating the pruned edge map includes removing the input edge pixels in regions of the input image having a high number of the input edge pixels from the input edge map.

8. The method as claimed in claim 6 wherein generating the pruned edge map includes removing the input edge pixels in regions of the input image having a low number of the input edge pixels from the input edge map.

9. The method as claimed in claim 6 wherein selecting the dominant image line from candidate lines includes selecting the dominant image line based on a transform location of the pruned edge pixels.

10. The method as claimed in claim 6 wherein identifying the input edge pixels includes identifying the input edge pixels from the input pixels with an edge detection operation.

11. A display system comprising:
a communication unit configured to receive an input image having input pixels; and
a control unit, coupled to the communication unit, configured to:
identify input edge pixels from the input pixels;
calculate an edge pixel sum for one of the input edge pixels based on the number of the input edge pixels surrounding one of the input edge pixels;
identify pruned edge pixels from the input edge pixels having the edge pixel sum between a high edge density threshold and a low edge density threshold; and
select a dominant image line from candidate lines calculated between the pruned edge pixels based on an intensity filtered edge pixel to generate a processed image for displaying on a device.

12. The system as claimed in claim 11 wherein the control unit is configured to calculate the edge pixel sum for a single one of the input edge pixels within an edge evaluation window.

13. The system as claimed in claim 11 wherein the control unit is configured to identify an intensity filtered pixel based on variations of a pixel intensity of the input pixels in a region of the input image for selection identification of the intensity filtered pixel.

14. The system as claimed in claim 11 wherein the control unit is configured to identify an intensity filtered edge pixel based on the pruned edge pixels for identification of the intensity filtered pixel.

15. The system as claimed in claim 11 wherein control unit is configured to:
generate an edge coordinate histogram having a local maxima bin representing the candidate lines; and
select the dominant image line as the candidate lines associated with the local maxima bin.

16. The system as claimed in claim 11 wherein the control unit is configured to:
generate an input edge map of the input edge pixels; and
generate a pruned edge map of the pruned edge pixels.

17. The system as claimed in claim 16 wherein the control unit is configured to remove the input edge pixels in regions of the input image having a high number of the input edge pixels from the input edge map.

18. The system as claimed in claim 16 wherein the control unit is configured to remove the input edge pixels in the regions of the input image having a low number of the input edge pixels from the input edge map.

19. The system as claimed in claim 16 wherein the control unit is configured to select the dominant image line based on a transform location of the pruned edge pixels.

20. The system as claimed in claim 16 wherein the control unit is configured to identify the input edge pixels from the input pixels with an edge detection operation.

* * * * *